United States Patent
Humpal et al.

(10) Patent No.: US 11,051,505 B2
(45) Date of Patent: Jul. 6, 2021

(54) MULTI-FLUID SPRAY SYSTEM AND METHOD FOR AGRICULTURAL PRODUCT APPLICATION

(71) Applicant: Deere & Company, Moline, IL (US)

(72) Inventors: Richard A. Humpal, Ankeny, IA (US);
Ryan P. Davis, Ankeny, IA (US);
Dennis J. Sullivan, Ankeny, IA (US);
Larry P. Ferguson, Johnston, IA (US)

(73) Assignee: DEERE & COMPANY, Moline, IL (US)

( * ) Notice: Subject to any disclaimer, the term of this patent is extended or adjusted under 35 U.S.C. 154(b) by 162 days.

(21) Appl. No.: 16/159,078

(22) Filed: Oct. 12, 2018

(65) Prior Publication Data
US 2020/0113171 A1 Apr. 16, 2020

(51) Int. Cl.
*A01M 7/00* (2006.01)
*A01C 23/04* (2006.01)
(Continued)

(52) U.S. Cl.
CPC ........... *A01M 7/0089* (2013.01); *A01C 23/04* (2013.01); *A01M 9/0007* (2013.01); *B05B 1/16* (2013.01);
(Continued)

(58) Field of Classification Search
CPC . B05B 1/005; B05B 1/20; B05B 1/30; A01M 7/0042; A01M 7/006; A01M 7/0089
(Continued)

(56) References Cited

U.S. PATENT DOCUMENTS 1,223,301 A * 4/1917 Tucker ................. B05B 7/0056
239/401
1,639,328 A * 8/1927 Coberly ................. F23D 14/54
239/128
(Continued)

FOREIGN PATENT DOCUMENTS

| AU | 2015221446 A1 | 1/2016 |
| EP | 2995383 | 3/2016 |

(Continued)

OTHER PUBLICATIONS

European Search Report issued in counterpart European Patent Application No. 19201822.4 dated Apr. 15, 2020 (5 pages).
(Continued)

*Primary Examiner* — Viet Le
(74) *Attorney, Agent, or Firm* — Klintworth & Rozenblat IP LLP

(57) ABSTRACT

A method of spraying multiple fluids from an agricultural machine includes supplying a first working fluid from a first source to a first spray nozzle, and supplying a second working fluid from a second source to the first spray nozzle. The method also includes operating at least one valve in the first spray nozzle to control flow of the first working fluid from the first source to one or more outlets of the first spray nozzle, and operating the at least one valve in the first spray nozzle to control flow of the second working fluid from the second source to the one or more outlets of the first spray nozzle. The method further includes selectively spraying the first working fluid through the one or more outlets of the first spray nozzle, and selectively spraying the second working fluid through the one or more outlets of the first spray nozzle.

14 Claims, 28 Drawing Sheets

Figure 1:
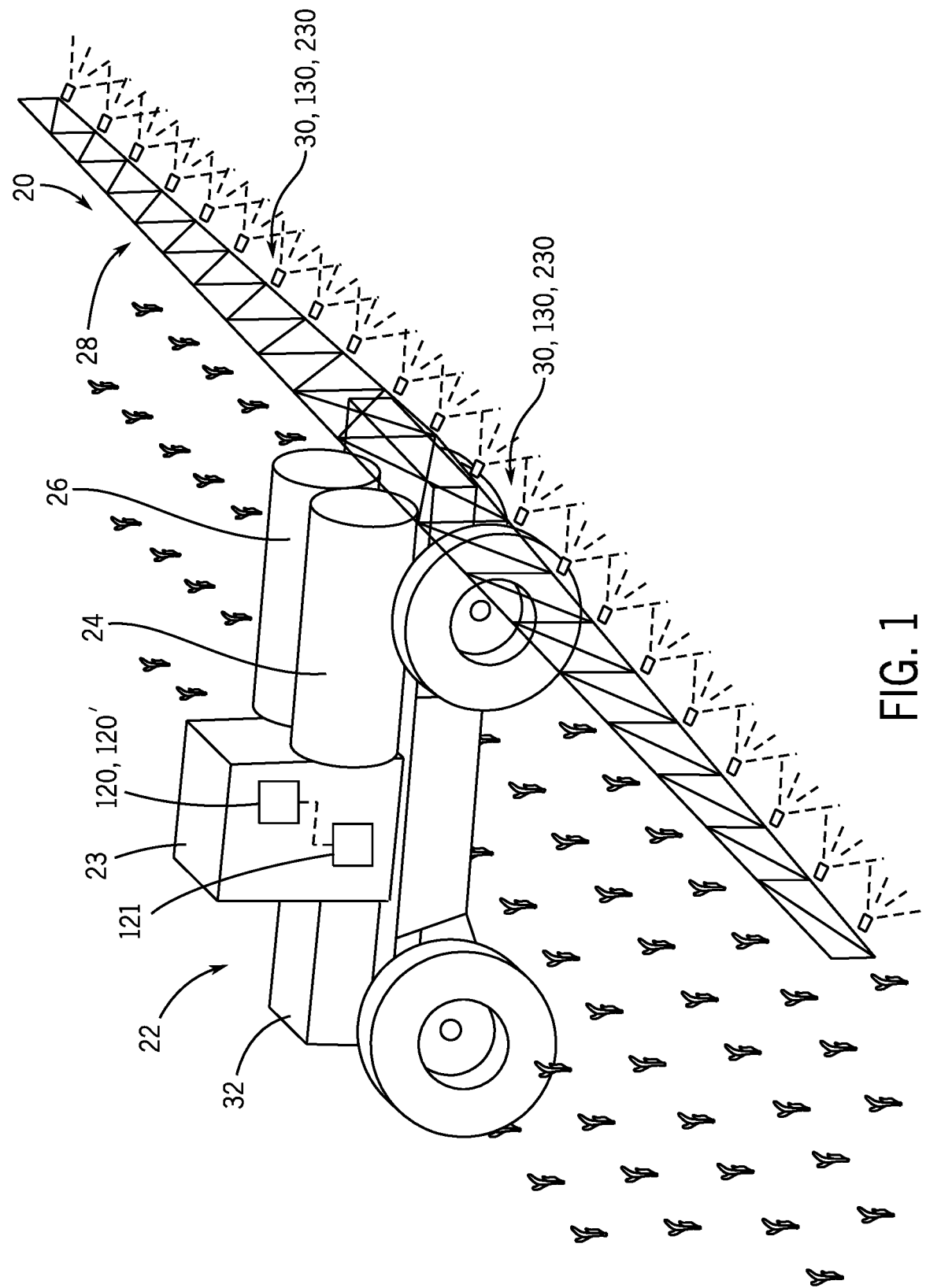
Figure 2:
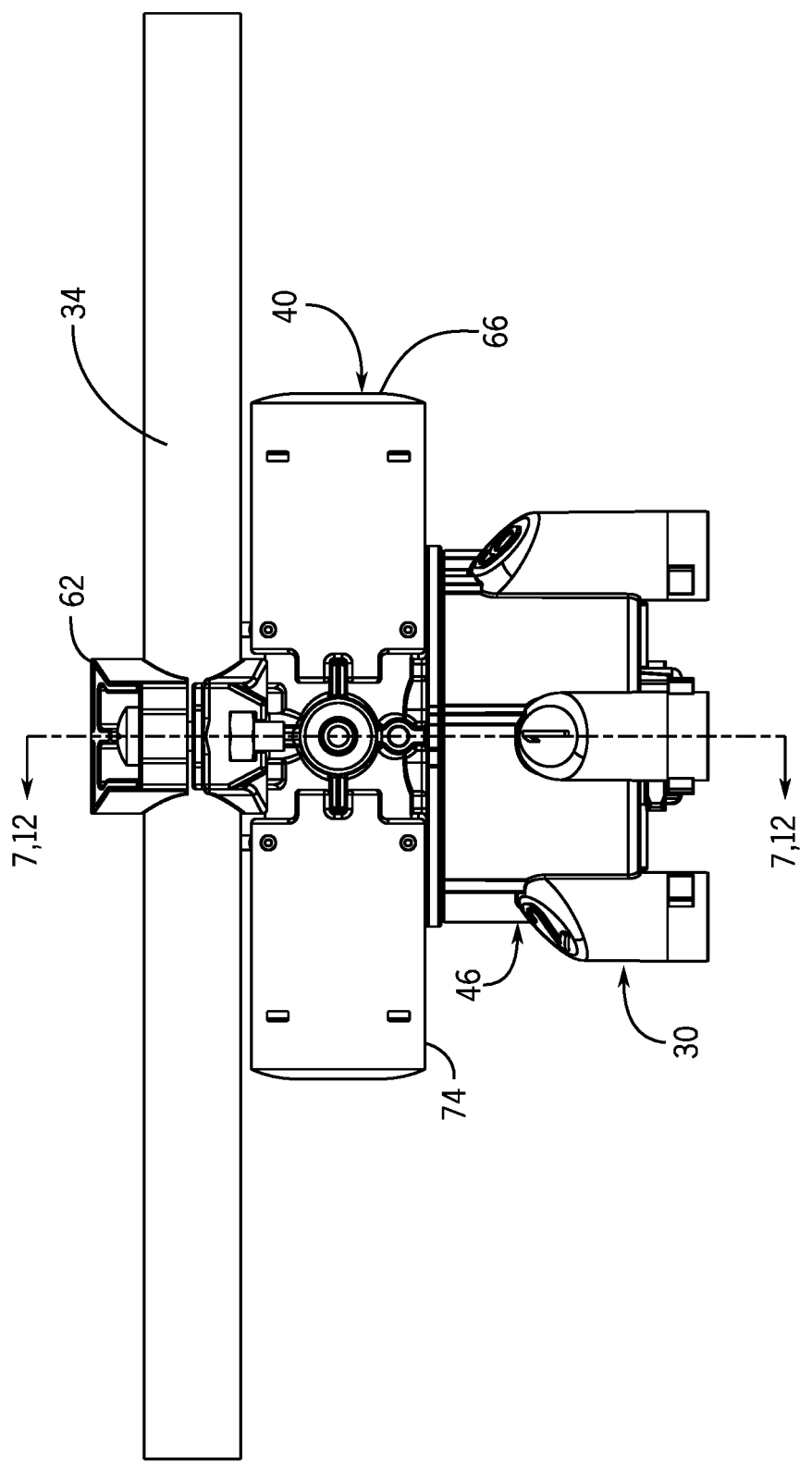
Figure 3:
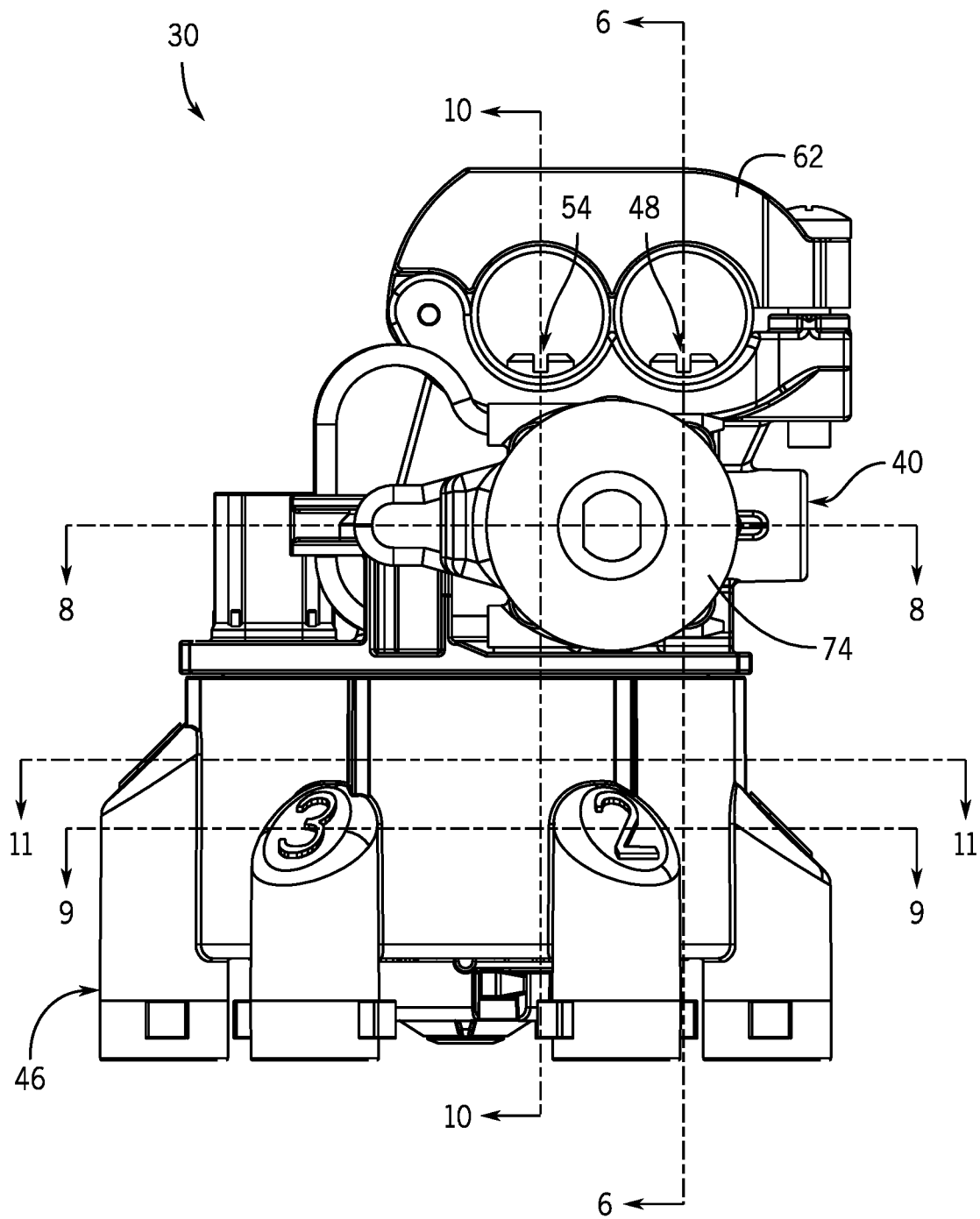

(51) Int. Cl.
  *A01M 9/00* (2006.01)
  *B05B 1/16* (2006.01)
  *B05B 7/04* (2006.01)
  *B05B 13/02* (2006.01)

(52) U.S. Cl.
  CPC ......... *B05B 7/0408* (2013.01); *B05B 13/0278* (2013.01)

(58) Field of Classification Search
  USPC .......... 239/164, 722, 412, 413, 416.1–416.5, 239/159–170
  See application file for complete search history.

(56) References Cited

U.S. PATENT DOCUMENTS

| | | | | | |
|---|---|---|---|---|---|
| 1,748,004 | A * | 2/1930 | Urquhart | B05B 7/04 | 239/401 |
| 1,770,232 | A * | 7/1930 | Fegley | F23D 11/10 | 239/381 |
| 2,697,485 | A * | 12/1954 | McNally | F23D 14/54 | 431/280 |
| 2,964,248 | A * | 12/1960 | O'Brien | B05B 1/04 | 239/544 |
| 3,330,484 | A * | 7/1967 | Johnson | B05B 7/1209 | 239/414 |
| 3,567,123 | A * | 3/1971 | Mitchell | E01C 7/353 | 239/159 |
| 3,575,319 | A * | 4/1971 | Safianoff | B29B 7/7438 | 222/135 |
| 3,592,385 | A * | 7/1971 | Smith | A01M 7/0092 | 239/10 |
| 3,633,795 | A * | 1/1972 | Brooks | B05B 9/04 | 222/134 |
| 3,635,372 | A * | 1/1972 | Van Dyck | B65D 83/60 | 222/3 |
| 3,640,461 | A * | 2/1972 | Koll | A01M 7/00 | 239/7 |
| 3,722,818 | A * | 3/1973 | Hayasaki | B23K 7/08 | 239/85 |
| 3,760,451 | A * | 9/1973 | Steed | B60S 1/3415 | 15/250.02 |
| 3,773,065 | A * | 11/1973 | Mattox | B05B 7/2486 | 137/263 |
| 3,779,533 | A * | 12/1973 | Etter | B23K 7/10 | 239/394 |
| 3,788,547 | A * | 1/1974 | Stahl | A01G 13/065 | 239/129 |
| 3,826,431 | A * | 7/1974 | Telge | A01M 7/005 | 239/551 |
| 3,863,841 | A * | 2/1975 | Berthoud | B05B 1/14 | 239/266 |
| 3,865,308 | A * | 2/1975 | Pringle | A01M 7/0092 | 239/61 |
| 3,873,004 | A * | 3/1975 | Feild | B08B 3/026 | 222/135 |
| 3,891,149 | A * | 6/1975 | Rendemonti | B05B 12/02 | 239/70 |
| 3,926,371 | A * | 12/1975 | Harrell | A01M 7/0082 | 239/146 |
| 4,004,733 | A * | 1/1977 | Law | B05B 5/043 | 239/3 |
| 4,033,481 | A * | 7/1977 | Hicks | B29B 7/603 | 222/134 |
| 4,055,303 | A * | 10/1977 | Brown | B01F 15/0412 | 239/142 |
| 4,058,260 | A * | 11/1977 | Lestradet | B05B 1/1645 | 239/394 |
| 4,089,470 | A * | 5/1978 | Strahman | B05B 7/0408 | 137/563 |
| 4,103,829 | A * | 8/1978 | Zagara | F23D 14/28 | 239/304 |
| 4,113,182 | A * | 9/1978 | Brago | B05B 7/32 | 222/134 |
| 4,177,675 | A * | 12/1979 | Friedenberg | A01M 7/0089 | 239/156 |
| 4,232,707 | A * | 11/1980 | Sturman | A01G 25/162 | 137/624.2 |
| 4,244,522 | A * | 1/1981 | Hartwig | A01M 7/0085 | 111/121 |
| 4,265,858 | A * | 5/1981 | Crum | B29B 7/748 | 422/129 |
| 4,330,086 | A * | 5/1982 | Nysted | B05B 7/0068 | 169/5 |
| 4,358,054 | A * | 11/1982 | Ehrat | B05B 9/06 | 239/155 |
| 4,457,258 | A * | 7/1984 | Cocks | B01F 13/1055 | 118/323 |
| 4,546,922 | A * | 10/1985 | Thometz | B05B 7/0408 | 137/625.4 |
| 4,642,614 | A * | 2/1987 | Cook | F16N 29/00 | 137/552 |
| 4,714,196 | A * | 12/1987 | McEachern | B05B 9/06 | 239/127 |
| 4,802,630 | A * | 2/1989 | Kromrey | B01F 5/0413 | 239/428 |
| 4,917,304 | A * | 4/1990 | Mazzei | A01C 23/042 | 239/304 |
| 5,076,497 | A * | 12/1991 | Rabitsch | B05B 1/267 | 239/310 |
| 5,127,429 | A * | 7/1992 | Kempf | B65G 53/32 | 137/240 |
| 5,193,744 | A * | 3/1993 | Goldstein | A01G 25/16 | 239/304 |
| 5,253,807 | A * | 10/1993 | Newbegin | A01G 25/023 | 239/11 |
| 5,261,451 | A * | 11/1993 | Spencer | F15B 13/07 | 137/551 |
| 5,267,690 | A * | 12/1993 | Gazzoni | A01G 25/165 | 137/624.14 |
| 5,278,423 | A * | 1/1994 | Wangler | A01M 7/0089 | 250/559.4 |
| 5,294,052 | A * | 3/1994 | Kukesh | B05B 7/06 | 239/112 |
| 5,356,077 | A * | 10/1994 | Shames | B05B 1/1645 | 239/383 |
| 5,653,389 | A * | 8/1997 | Henderson | A01M 7/0089 | 239/172 |
| 5,656,090 | A * | 8/1997 | Preston | B05B 12/14 | 118/405 |
| 5,862,833 | A * | 1/1999 | Perez | B23Q 1/0036 | 137/625.11 |
| 5,873,647 | A * | 2/1999 | Kurtz | B05B 15/00 | 362/101 |
| 5,927,330 | A * | 7/1999 | Minton | F16K 11/076 | 137/625.11 |
| 5,927,603 | A * | 7/1999 | McNabb | A01G 25/092 | 239/63 |
| 5,938,123 | A * | 8/1999 | Heitzman | B05B 3/04 | 239/383 |
| 6,000,430 | A * | 12/1999 | Nafz | F16K 11/0876 | 137/597 |
| 6,126,088 | A * | 10/2000 | Wilger | A01M 7/0089 | 239/159 |
| 6,193,166 | B1 * | 2/2001 | Miller | A01M 7/006 | 239/76 |
| 6,325,302 | B1 * | 12/2001 | Guzowski | B05B 1/14 | 239/128 |
| 6,425,534 | B2 * | 7/2002 | Ketcham | B05B 7/2443 | 137/893 |
| 6,918,757 | B2 * | 7/2005 | Nakamura | F23D 11/26 | 431/89 |
| 7,044,831 | B2 * | 5/2006 | Gabriel | B24C 7/0046 | 222/630 |
| 7,066,402 | B2 * | 6/2006 | Goebel | A01M 7/006 | 239/170 |
| 7,159,797 | B1 * | 1/2007 | Lammers | B05B 15/65 | 239/394 |

(56) References Cited

U.S. PATENT DOCUMENTS

| | | | |
|---|---|---|---|
| 7,207,503 B1* | 4/2007 | Stengel | A01C 23/042 239/310 |
| 7,311,004 B2* | 12/2007 | Giles | A01C 23/047 73/592 |
| 7,343,933 B2* | 3/2008 | McBeth | F16K 11/074 137/625.11 |
| 7,789,320 B1* | 9/2010 | Schwartz | A47G 21/18 138/37 |
| 8,105,075 B2* | 1/2012 | Huau | E21B 41/0071 431/186 |
| 8,109,448 B2* | 2/2012 | Giles | A01M 7/006 239/428 |
| 8,191,795 B2* | 6/2012 | Grimm | A01M 7/0089 239/1 |
| 8,919,676 B2 | 12/2014 | Funseth et al. | |
| 8,978,578 B2* | 3/2015 | Jittu | B01F 13/1002 118/308 |
| 9,061,296 B2* | 6/2015 | Peterson | B05B 1/14 |
| 9,073,070 B2* | 7/2015 | Funseth | B05B 1/14 |
| 9,085,005 B2* | 7/2015 | Townsend | B05B 1/1681 |
| 9,266,124 B2* | 2/2016 | Humpal | B05B 1/1645 |
| D766,399 S * | 9/2016 | Bullock | D23/213 |
| 9,504,212 B2* | 11/2016 | Michael | A01G 25/16 |
| 9,781,916 B2* | 10/2017 | Preheim | A01M 7/0089 |
| 9,884,330 B2* | 2/2018 | Humpal | B05B 1/30 |
| 10,189,031 B2* | 1/2019 | Funseth | B05B 1/083 |
| 10,295,076 B2* | 5/2019 | Russalian | F01P 7/02 |
| 10,391,510 B2 | 8/2019 | Posselius et al. | |
| 10,568,257 B2* | 2/2020 | Shivak | A01C 7/081 |
| 2001/0000611 A1* | 5/2001 | Cline | B05B 7/32 222/1 |
| 2002/0000476 A1* | 1/2002 | Swanson | A01M 21/043 239/1 |
| 2002/0096579 A1* | 7/2002 | Sinders | B05B 9/01 239/398 |
| 2002/0190140 A1* | 12/2002 | Arenson | A62C 31/03 239/391 |
| 2004/0211253 A1* | 10/2004 | Horie | G01F 1/698 73/204.15 |
| 2005/0000277 A1* | 1/2005 | Giles | A01M 7/0096 73/114.48 |
| 2006/0063676 A1* | 3/2006 | Brigance | A01N 25/04 504/116.1 |
| 2006/0255176 A1* | 11/2006 | Yeiser | B05B 1/083 239/263.1 |
| 2007/0295083 A1* | 12/2007 | Kawai | G01F 1/6845 73/204.26 |
| 2008/0016959 A1* | 1/2008 | Nakano | G01F 1/6842 73/204.26 |
| 2008/0087750 A1* | 4/2008 | Waddelow | B05B 15/65 239/550 |
| 2008/0245282 A1* | 10/2008 | Richards | B05B 7/0025 111/127 |
| 2009/0134237 A1* | 5/2009 | Giles | B05B 7/0433 239/8 |
| 2010/0032492 A1* | 2/2010 | Grimm | A01M 7/0089 239/1 |
| 2012/0168530 A1* | 7/2012 | Ellingson | B05B 12/008 239/71 |
| 2013/0161419 A1* | 6/2013 | Funseth | A01M 7/006 239/546 |
| 2013/0168473 A1* | 7/2013 | Langkamp | B05B 1/1609 239/562 |
| 2013/0284827 A1* | 10/2013 | Humpal | B05B 15/658 239/549 |
| 2014/0083121 A1* | 3/2014 | Chiappetta, Jr. | F25B 49/02 62/115 |
| 2014/0209703 A1* | 7/2014 | Jerdee | B26D 3/00 239/135 |
| 2014/0263705 A1* | 9/2014 | Michael | A01G 25/16 239/10 |
| 2015/0075655 A1* | 3/2015 | Otarola Olguin | G05D 7/0647 137/601.14 |
| 2015/0275451 A1* | 10/2015 | Sorstrom | E02B 15/041 239/1 |
| 2015/0289443 A1* | 10/2015 | Garuti | B05B 15/658 239/444 |
| 2015/0367357 A1 | 12/2015 | Humpal et al. | |
| 2015/0367358 A1* | 12/2015 | Funseth | B05B 1/20 239/159 |
| 2015/0375247 A1* | 12/2015 | Funseth | B05B 1/169 239/68 |
| 2016/0120118 A1* | 5/2016 | Bouten | A01M 7/0092 222/1 |
| 2016/0175869 A1* | 6/2016 | Sullivan | A01M 7/0042 239/11 |
| 2016/0178422 A1* | 6/2016 | Humpal | A01M 7/0089 239/71 |
| 2017/0049093 A1* | 2/2017 | Belden | A01M 7/0092 |
| 2017/0050206 A1* | 2/2017 | Bullock | B05B 15/658 |
| 2017/0079200 A1* | 3/2017 | Posselius | B05B 12/1418 |
| 2017/0265374 A1* | 9/2017 | Wintemute | G06K 7/10366 |
| 2017/0326570 A1* | 11/2017 | Charcosset | A01M 7/00 |
| 2019/0000065 A1* | 1/2019 | Gutsmann | A01M 7/0046 |
| 2019/0217319 A1* | 7/2019 | Harvey | B05B 9/06 |
| 2020/0113170 A1 | 4/2020 | Humpal et al. | |

FOREIGN PATENT DOCUMENTS

| | | |
|---|---|---|
| WO | 2012012318 A2 | 1/2012 |
| WO | 2014067785 A1 | 5/2014 |

OTHER PUBLICATIONS

USPTO Office Action issued in U.S. Utility Appl. No. 16/159,078 dated May 22, 2020. (36 pages).

European Search Report issued in counterpart European Patent Application No. 19201830.7 dated Mar. 26, 2020. (8 pages).

* cited by examiner

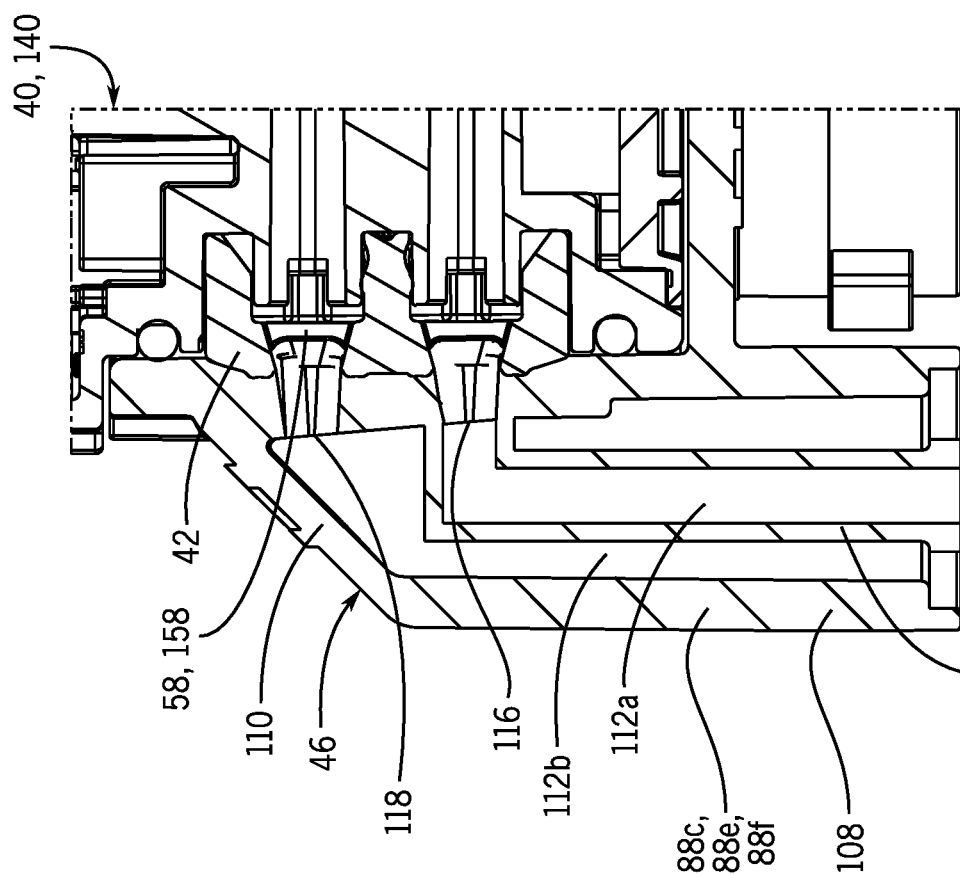
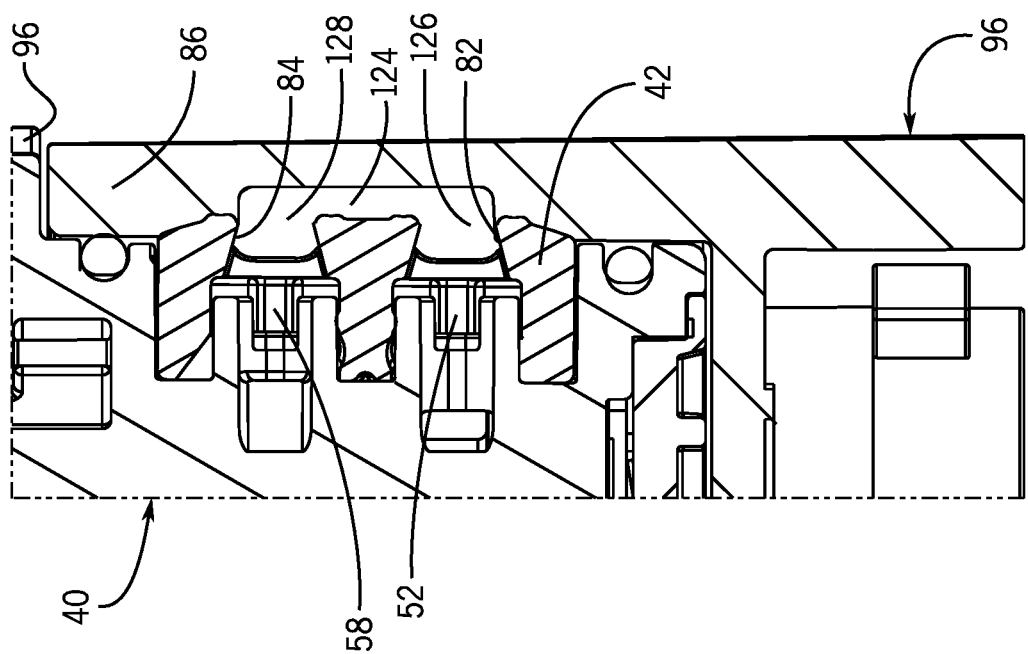

MULTI-FLUID SPRAY SYSTEM AND METHOD FOR AGRICULTURAL PRODUCT APPLICATION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to a spray system carrying an array of spray nozzles for applying agricultural products.

BACKGROUND OF THE DISCLOSURE

Large-scale spray systems, such as those used in the agricultural industry, apply various agricultural compounds to soil, seed, crop and other vegetation, including various nutrients, fertilizers, herbicides, pesticides, insecticides and so on. Large agricultural spray systems may be towed implements or self-propelled vehicles with large spray booms carrying a working fluid distribution system across a wide swath of field. The spray system may have various lines (e.g., hoses, pipes, etc.) that run working fluids from supply tanks to multiple spray nozzles through which the fluids are released.

SUMMARY OF THE DISCLOSURE

The disclosure provides systems and methods for agricultural sprayers having multi-fluid spray nozzles that are each capable of applying multiple fluids in separate or combined fluid streams.

In one aspect, the disclosure provides a method of spraying multiple fluids from an agricultural machine. The method includes supplying a first working fluid from a first source to a first spray nozzle, and supplying a second working fluid from a second source to the first spray nozzle. The method also includes operating at least one valve in the first spray nozzle to control flow of the first working fluid from the first source to one or more outlets of the first spray nozzle, and operating the at least one valve in the first spray nozzle to control flow of the second working fluid from the second source to the one or more outlets of the first spray nozzle. The method further includes selectively spraying the first working fluid through the one or more outlets of the first spray nozzle, and selectively spraying the second working fluid through the one or more outlets of the first spray nozzle.

Figure 28A:
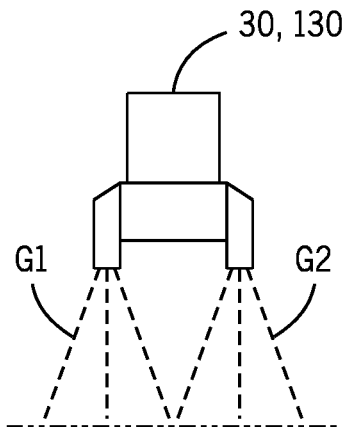
Figure 28B:
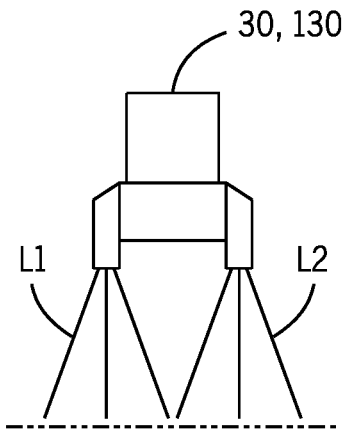
Figure 28C:
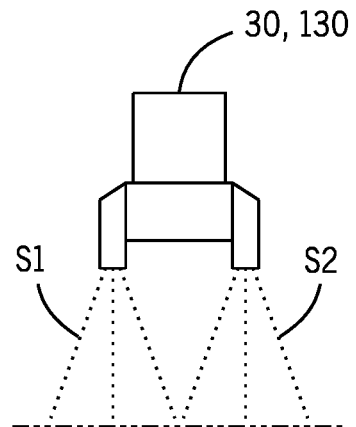
Figure 29A:
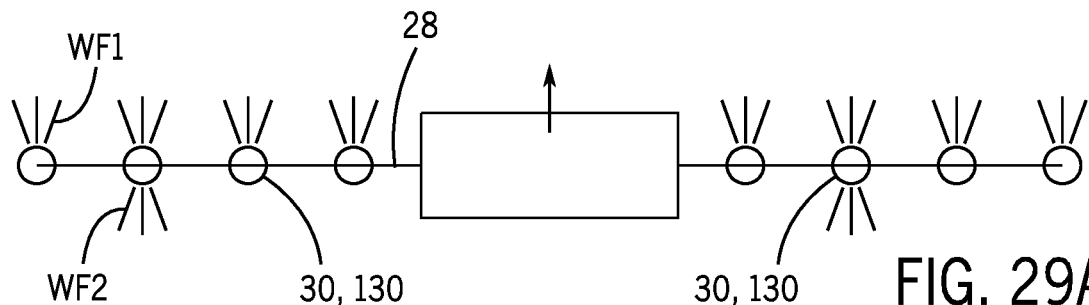
Figure 29B:
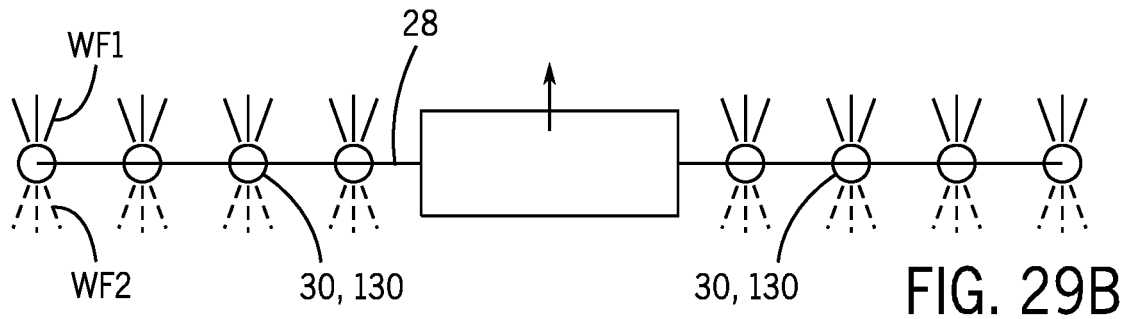
Figure 29C:
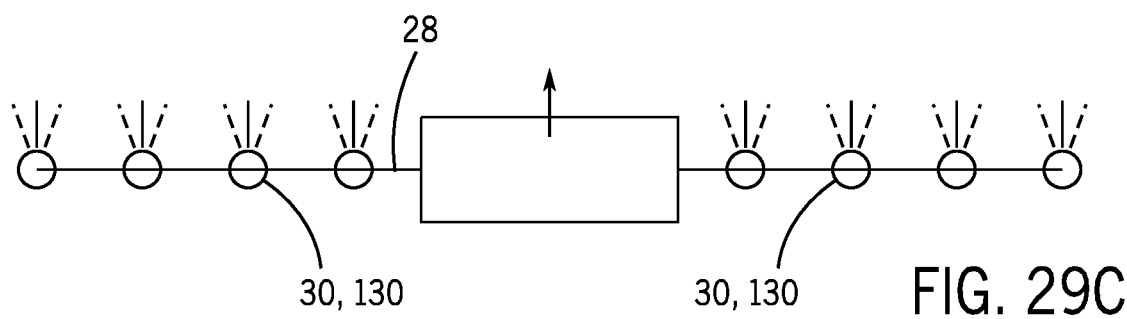

In another aspect of the disclosure, the method includes supplying a first working fluid from a first source to a first spray nozzle, and supplying a second working fluid from a second source to the first spray nozzle. The method also includes operating at least one valve in the first spray nozzle to control flow of the first working fluid from the first source to one or more outlets of the first spray nozzle, and operating the at least one valve in the first spray nozzle to control flow of the second working fluid from the second source to the one or more outlets of the first spray nozzle. The method further includes selectively spraying the first working fluid through the one or more outlets of the first spray nozzle, and selectively spraying the second working fluid through the one or more outlets of the first spray nozzle. The selective spraying of the second working fluid is coordinated with the selective spraying of the first working fluid to affect one or more of a direction, a dispersion, a concentration and a state or property of the first working fluid after the first working fluid is selectively sprayed from the first spray nozzle.

The details of one or more embodiments are set forth in the accompanying drawings and the description below. Other features and advantages will become apparent from the description, the drawings, and the claims.

BRIEF DESCRIPTION OF THE DRAWINGS

FIG. 1 is a simplified perspective view of an example agricultural machine in the form of an agricultural sprayer in which the multi-fluid spray system and method of this disclosure may be incorporated;

FIGS. 2 and 3 are elevational views of an example spray nozzle for the agricultural sprayer of FIG. 1, having distribution lines attached thereto;

FIGS. 4 and 5 are schematic representations of the example spray nozzle of FIG. 2 incorporated into a control system;

FIG. 6 is a cross-sectional view of the example spray nozzle of FIG. 2 taken along line 6-6 of FIG. 3;

FIG. 7 is a cross-sectional view along line 7-7 of FIG. 2;

FIG. 8 is a cross-sectional view along line 8-8 of FIG. 3;

FIG. 9 is a cross-sectional view along line 9-9 of FIG. 3;

FIG. 10 is a cross-sectional view along line 10-10 of FIG. 3;

FIG. 11 is a cross-sectional view along line 11-11 of FIG. 3;

FIG. 12 a cross-sectional view similar to FIG. 7, but showing a modification;

FIG. 13A is a schematic representations of a prior art spray nozzle;

FIG. 13B is a cross-sectional view of the prior art spray nozzle;

FIG. 14 is a perspective view of a second embodiment of a spray nozzle for the agricultural implement of FIG. 1, having distribution lines attached thereto;

FIG. 15 is a plan view of the spray nozzle of FIG. 13, having distribution lines attached thereto;

FIG. 16 is a schematic representation of the spray nozzle of FIG. 14;

FIG. 17 is a cross-sectional view along line 17-17 of FIG. 15;

FIG. 18 is a cross-sectional view along line 18-18 of FIG. 15;

FIGS. 19 and 20 are schematic representations of alternate embodiments of the spray nozzle of FIGS. 2 and 14;

FIG. 21 is a partial cross-sectional view of the spray nozzle of FIGS. 2 and 14 showing a modification thereto;

FIG. 22 is a schematic view of a controller interacting with other components of the spray system;

FIG. 23 is a partial cross-sectional view of the spray nozzle of FIGS. 2 and 14 showing a modification thereto;

FIG. 24 is a perspective view of yet another embodiment of a spray nozzle for the agricultural implement of FIG. 1;

FIG. 25 is a cross-sectional view along line 25-25 of FIG. 24;

FIG. 26 is a cross-sectional view along line 26-26 of FIG. 24;

FIG. 27 is a cross-sectional view of a prior art spray nozzle;

FIGS. 28A-28C are schematic views of a spray nozzle of the spray system showing that different fluids passing therethrough;

FIGS. 29A-29C are schematic views of the spray system in different operating conditions; and FIGS. 30-34 are schematic views of a spray nozzle of the spray system in different operating conditions.

Like reference symbols in the various drawings indicate like elements.

DETAILED DESCRIPTION

The following describes one or more example embodiments of the disclosed multi-fluid spray nozzle system and method for applying agricultural products to a field, as shown in the accompanying figures of the drawings described briefly above. Various modifications to the example embodiments may be contemplated by one of skill in the art.

The present disclosure is described in the context of an agricultural spray system having multiple spray nozzles. The spray system may be implemented in any of various vehicles, implements and machines, including aircraft-flown or vehicle-towed spray equipment, self-propelled sprayers, various stationary or movable irrigation solutions, and so on. In various implementations, the spray system is part of a large-scale agricultural machine that carries supply tanks filled with working fluid to be released through the spray nozzles. Large-scale agricultural sprayers, for example, have large spray booms that carry fluid distribution lines (e.g., flexible hoses or rigid pipes) to spray nozzles so as to treat a wide swath of field. Some such large-scale agricultural sprayers may include 50 to 150 nozzles (or more). The spray system may be also be incorporated into various other agricultural machines (e.g., harvesters, planters, commodity vehicles, etc.) and other work machines.

Conventional agricultural spray systems apply a single working fluid from each spray nozzle, typically applying one agricultural product per pass through the field. If it is desired to apply one or more additional products, a secondary spray system would typically be used, either on the same machine as the primary spray system, or on a trailing sprayer or other machine. To avoid the expense and complexity of multiple spray systems and/or machines, a single spray system may be used in which case the first working fluid supply tank would be emptied, the tank, spray nozzles and lines flushed to avoid cross-contamination, and the supply tank then refilled with another working fluid. This not only requires changing out the fluids, but also multiple passes through the field, to the detriment of productivity.

The spray system of the present disclosure reduces or eliminates these concerns by allowing multiple working fluids to be applied independently or combined at a specific location or locations of the sprayer system. Thus, in one aspect of the disclosure, the field may be sprayed with multiple working fluids through a single spray nozzle, or through each of a set of spray nozzles, in a single pass as the vehicle traverses the field. Each spray nozzle, and fluid paths therethrough, can be individually controlled.

Another aspect of the disclosure provides methods of spraying multiple fluids to apply an agricultural product or products. More specifically, a first working fluid from a first source is supplied to a spray nozzle, and a second working fluid from a second source is supplied to the spray nozzle. At least one valve in the spray nozzle is operated to control flow of the first working fluid from the first source to one or more outlets of the first spray nozzle, and the at least one valve in the spray nozzle is operated to control flow of the second working fluid from the second source to the one or more outlets of the first spray nozzle. The first working fluid is selectively sprayed through the one or more outlets of the spray nozzle, and the second working fluid is selectively sprayed through the one or more outlets of the first spray nozzle. This method may be implemented using a single spray nozzle or using multiple identically or similarly configured spray nozzles capable of handle multiple fluids.

The disclosed spray system provides various advantages and spray options to the end user in a wide-variety of applications. By way of examples of two fluid spray systems, in one application, all or a bank of the spray nozzles can be controlled to provide a broadcast spray of a first working fluid along the spray boom and then subsequently or simultaneously a selected one or more individual spray nozzles can be controlled to apply a spot treatment of a second working fluid as the spray system traverses the field. In another application, all or a bank of the spray nozzles can be controlled to provide a broadcast spray of a first working fluid and then subsequently or simultaneously also a broadcast spray of a second working fluid as the spray system traverses the field. In another application, all or a bank of the spray nozzles can be controlled to provide a combined broadcast spray of a first working fluid and a second working fluid as the spray system traverses the field.

In various other two fluid spray embodiments, the first working fluid and the second working fluid are selectively sprayed simultaneously or selectively sprayed sequentially. The first working fluid and the second working fluid may be combined and selectively sprayed through a common spray outlet or outlets of the spray nozzle. The first working fluid and the second working fluid may also be selectively sprayed through different outlets. The selective spraying of the second working fluid may be coordinated with the selective spraying of the first working fluid to affect the direction, drift or dispersion, concentration or density, and/or the state or property of the first working fluid after the first working fluid is selectively sprayed from the spray nozzle. In some embodiments, the selective spraying of the first or second working fluid clears an obstacle or other item, such as the canopy of a crop to open a path for the other working fluid to reach a base of the crop. In some embodiments, the selective spraying of the one of the working fluids forms a barrier adjacent the other working fluid after it is selectively sprayed from the spray nozzle. In some embodiments, during the selective spraying of the first working fluid and the second working fluid, the working fluids physically contact each other or overlap to physically interact. In some cases, the interaction of the working fluids will change the size of the droplets of one or both of the working fluids, or react chemically, electrically and/or genetically. Multiple spray nozzles can be supplied with the first and second working fluids and operated in the same manner. One or more spray nozzles can be supplied with three or more working fluids.

The spray system may serve to apply various working fluids, such as certain agricultural products, including, for example, various fertilizers, nutrients, herbicides, fungicides, pesticides and insecticides. The spray system may also be used to spray various other substances in various states of matter. For example, the spray system may work with various carrier or delivery control compounds to better disperse or otherwise deliver the product to the intended target. In some cases, for example, drift retardant compounds may be sprayed from the spray system in a coordinated manner with respect to certain agricultural products to, for example, enhance the mass of the resultant emission, and thereby enhance its effect by gravity to limit its drift away from the intended target (e.g., soil, seeds, crops and so on). Various other substances may be used with the spray system, including various cleaning agents (detergents and the like), various genetic or genetic-modifying substances (e.g., RNA), and various activating agents or receptors that cooperate with other products or environmental factors (e.g., light wavelengths) to change the state or a property of the receptor compound (e.g., state of matter, viscosity, density and so on). The working fluids may be in any state or form, including liquids, solids suspended in liquid, gases, and flowable granular solids, foams and gels.

In furtherance of the above, one or more embodiments of a spray system 20 and methods for using same are provided by the present disclosure. FIG. 1 depicts a perspective view of an example vehicle 22 which uses the spray system 20 thereon. The vehicle 22 has a cab 23 in which an operator is seated and tows first and second working fluid sources, such as working fluid storage tanks 24, 26, and also a spray boom 28 having many spray nozzles 30, 130, 230 mounted thereon. In other embodiments, the spray boom 28 is mounted to a front 32 of the vehicle 22. Working fluids from the storage tank 24 are transferred through manifolds and working fluid distribution lines 34 that are attached to the spray boom 28 to each of the spray nozzles 30, 130, 230. Working fluids from the working fluid storage tank 26 are transferred through manifolds and working fluid distribution lines 36 that are attached to the spray boom 28 to each of the spray nozzles 30, 130, 230. The spray boom 28 may also include main control valves (not shown) that control working fluids to the distribution lines 34, 36 and subsequently to the spray nozzles 30, 130, 230. The vehicle 22 may also include various pumps (not shown) for supplying working fluid to the main control valves.

The spray system 20 may also include one or more controllers 120, 120', such as electronic controller unit (ECU), for control of various aspects of the operation of the spray system 20, in general. The controllers 120, 120' may be configured as a computing device with associated processor devices and memory architectures, as a hard-wired computing circuit (or circuits), as a programmable circuit, as a hydraulic, electrical or electro-hydraulic controller, or otherwise. As such, the controllers 120, 120' may be configured to execute various computational and control functionality with respect to the spray system 20 (and other machinery). In some embodiments, the controller 120, 120' may be configured to receive input signals in various formats (e.g., voltage signals, current signals, and so on), and to output command signals in various formats (e.g., voltage signals, current signals, mechanical movements, and so on). In some embodiments, the controller 120, 120' (or a portion thereof) may be configured as an assembly of components (e.g., valves, flow lines, pistons and cylinders, and so on), such that control of various devices (e.g., pumps or motors) may be affected with, and based upon, hydraulic, mechanical, or other signals and movements. The controller 120, 120' may be in electronic, hydraulic, mechanical, or other communication with various other systems or devices of the vehicle 22 or the spray system 20 (or other machinery). For example, the controller 120, 120' may be in electronic or hydraulic communication with various actuators, sensors, and other devices within (or outside of) the vehicle 22 or the spray system 20. The controller 120, 120' may communicate with other systems or devices (including other controllers) in various known ways, including via a CAN bus (not shown) of the vehicle 22 or spray system 20, via wireless or hydraulic communication means, or otherwise. In this example, the controller 120, 120' is associated with the vehicle 22; however, it will be understood that the controller 120, 120' may be associated with the spray system 20, or may be associated with a remote device, such as a portable electronic device.

With regard to the first example embodiment depicted in FIGS. 2-11, the spray nozzle 30 includes a body 40, a pair of gaskets 42, 44 attached to the body 40, and a turret 46 movably attached to the body 40. Various spray tips (not shown) can be connected to the turret 46 to provide for different spray patterns.

Figure 4:
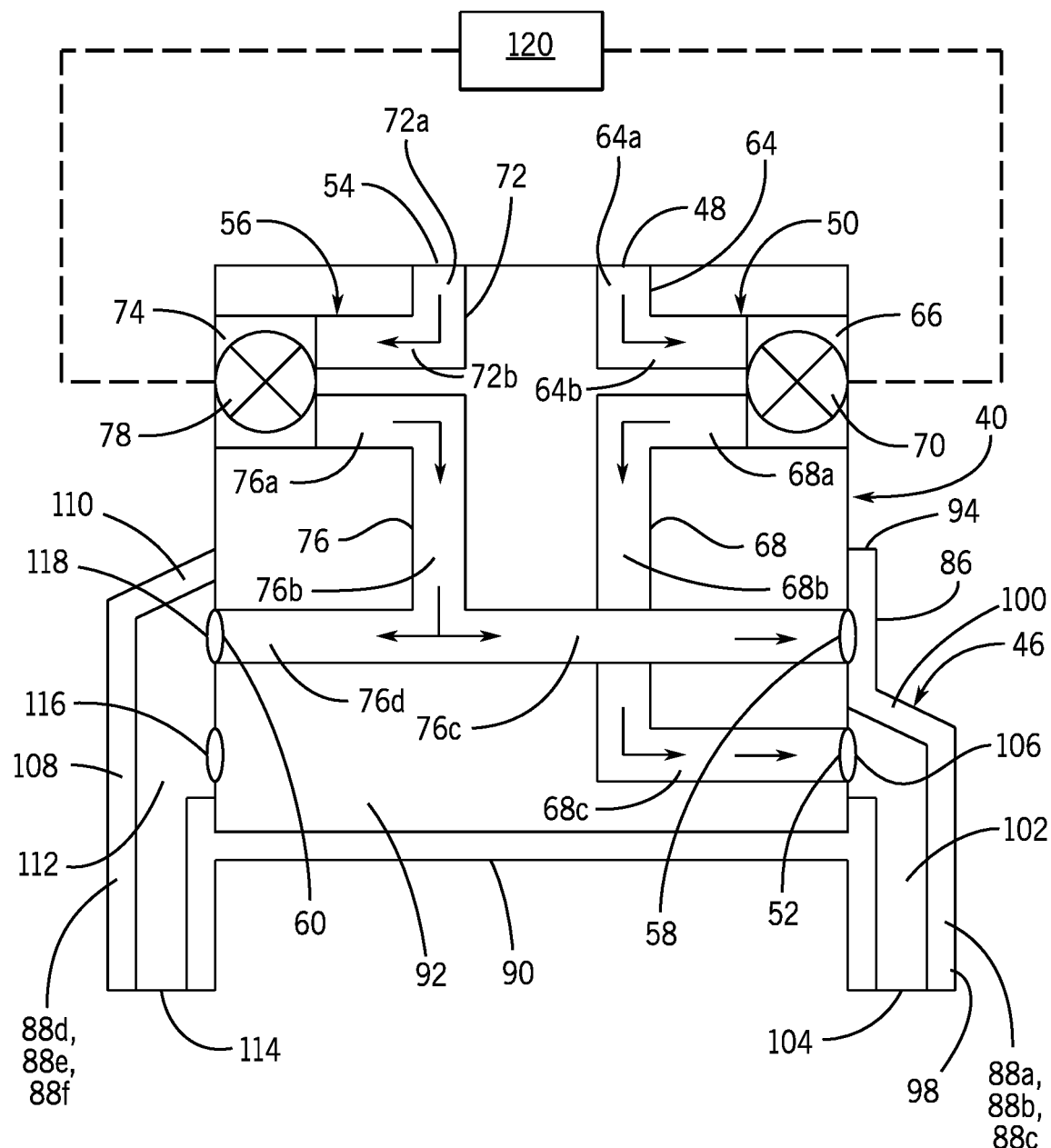
Figure 5:
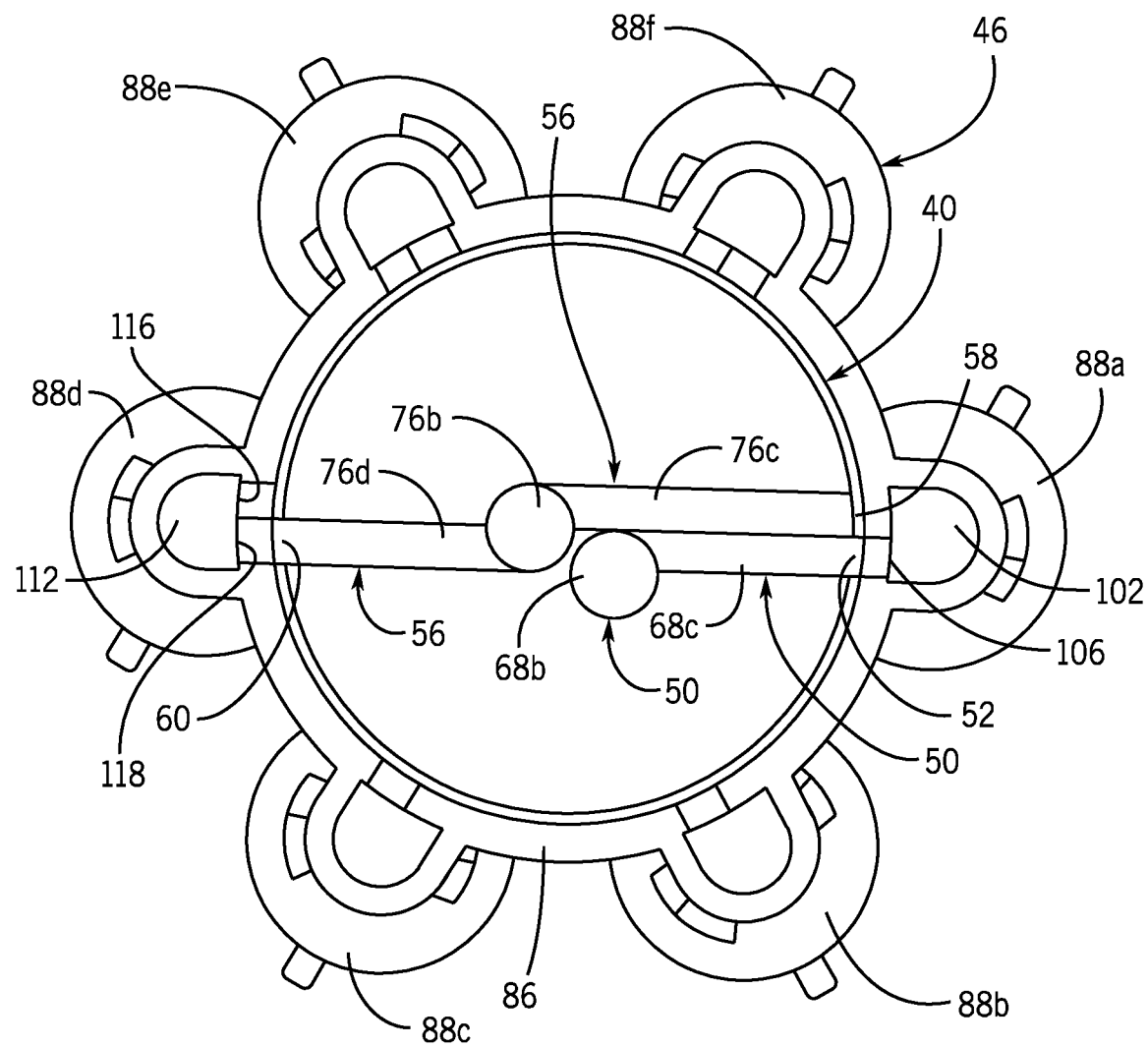

The body 40 has a first inlet 48 which is connected to the distribution line 34 and is connected to a first fluid path 50 which is routed though the body 40 to an outlet 52 of the first fluid path 50, and a second inlet 54 which is connected to the distribution line 36 and is connected to a second fluid path 56 which is routed though the body 40 to first and second outlets 58, 60 of the second fluid path 56. The first and second fluid paths 50, 56 are separated or isolated from each other and are independent from each other such that no mixing of the working fluids is provided for through the body 40. The fluid paths 50, 56 are schematically shown in FIGS. 4 and 5. A mounting ring 62, having two openings, surrounds the first and second inlets 48, 54 and is used to mount the spray nozzle 30 to the distribution lines 34, 36.

The first fluid path 50 provides a path from the first inlet 48, to an internal passageway 64, through a spray nozzle tube 66, through an internal passageway 68 to the outlet 52. The spray nozzle tube 66 has a control valve 70 which allows or disables the flow of working fluid from the passageway 64 to the passageway 68. As shown, the passageway 64 has a first section 64a which extends vertically downward from the first inlet 48 and a second section 64b which extends horizontally from the lower end of the first section 64a to an input of the control valve 70. The passageway 68 has a first section 68a which extends horizontally from the output of the control valve 70, a second section 68b which extends vertically downward from the end of the first section 68a, and a third section 68c which extends horizontally from the second section 68b to the outlet 52. Therefore, when the control valve 70 of the first fluid path 50 is open, working fluid flows through the first inlet 48, through the first section 64a of the passageway 64, through the second section 64b of the passageway 64, through the control valve 70, through the first section 68a of the passageway 68, through the second section 68b of the passageway 68, through the third section 68c of the passageway 68, to the outlet 52.

The second fluid path 56 provides a path from the second inlet 54, to an internal passageway 72, through a spray nozzle tube 74, through an internal passageway 76 to the first and second outlets 58, 60. The spray nozzle tube 74 has a control valve 78 which allows or disables the flow of working fluid from the passageway 72 to the passageway 76. As shown, the passageway 72 has a first section 72a which extends vertically downward from the second inlet 54, and a second section 72b which extends horizontally from the lower end of the first section 72a to an input of the control valve 78. The passageway 76 has a first section 76a which extends horizontally from the output of the control valve 78, a second section 76b which extends vertically downward from the end of the first section 76a, a third section 76c which extends horizontally from the lower end of the second section 76b to the first outlet 58, a fourth section 76d which extends horizontally from the lower end of the second section 76b to the second outlet 60. Therefore, when the control valve 78 of the second fluid path 56 is open, working fluid flows through the second inlet 54, through the first section 72a of the passageway 72, through the second section 72b of the passageway 72, through the control valve 78, through the first section 76a of the passageway 76, through the second section 76b of the passageway 76, into the third section 76c of the passageway 76, into the fourth section 76d of the passageway 76, and to one of the first and second outlets 58, 60 as described herein.

In an embodiment, the first and second outlets 58, 60 are horizontally aligned. In an embodiment, the outlet 52 is vertically aligned with the first outlet 58 and the outlet 52 is vertically lower than the first outlet 58.

Control valves 70, 78 include solenoid valves, electromagnetic spring coil, pneumatic lever, bellows, and so on. Solenoid valves may use pulse width modulation as is known in the art to regulate the flow of the working fluid through the respective fluid paths 50, 56.

In an embodiment, the distribution lines 34, 36 are parallel to each other and each spray nozzle tube 66, 74 has a central axis which is parallel to the distribution lines 34, 36 and parallel to each other. In an embodiment, the spray nozzle tubes 66, 74 are perpendicular to the mounting ring 62.

Figure 6:
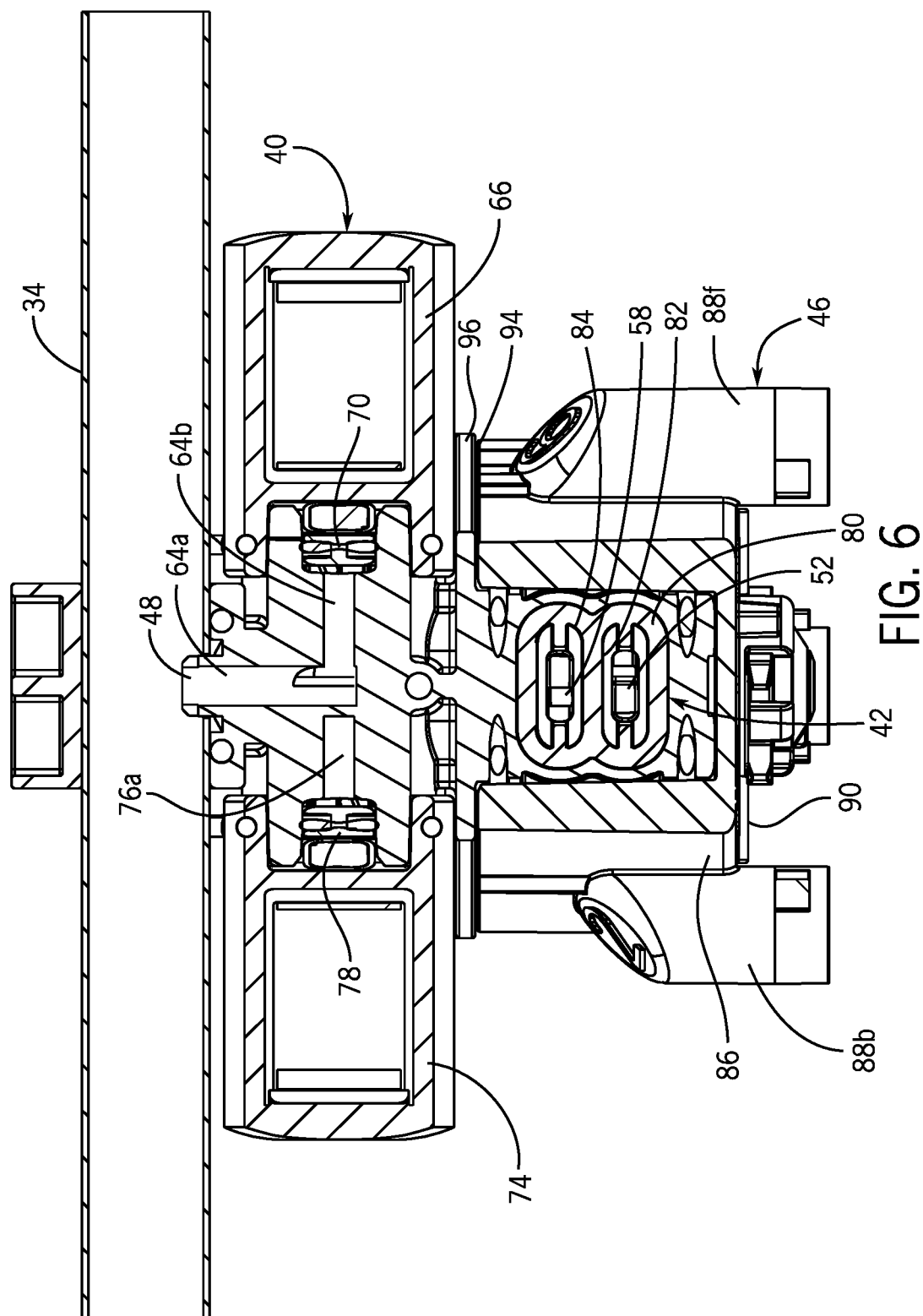
Figure 7:
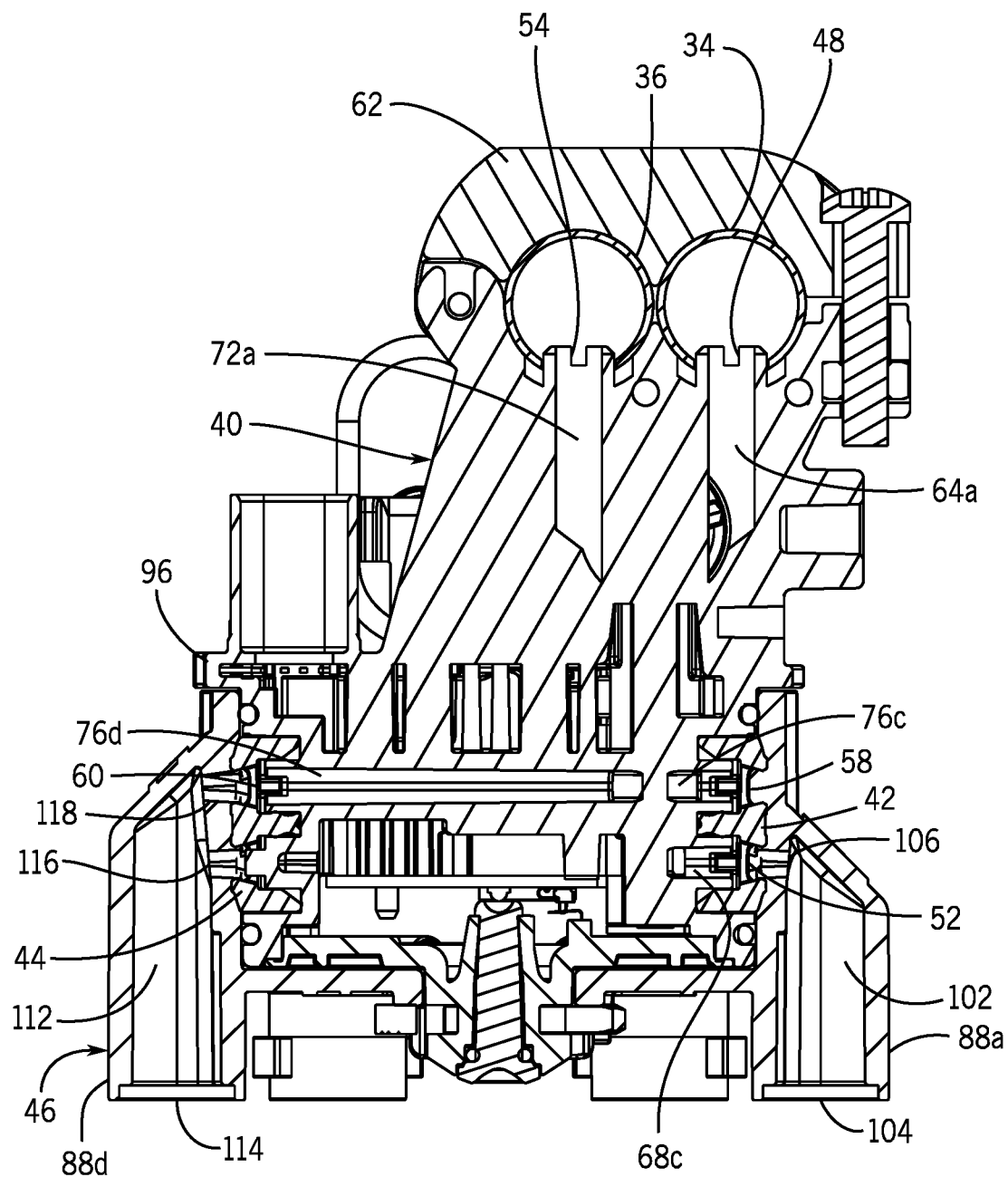
Figure 8:
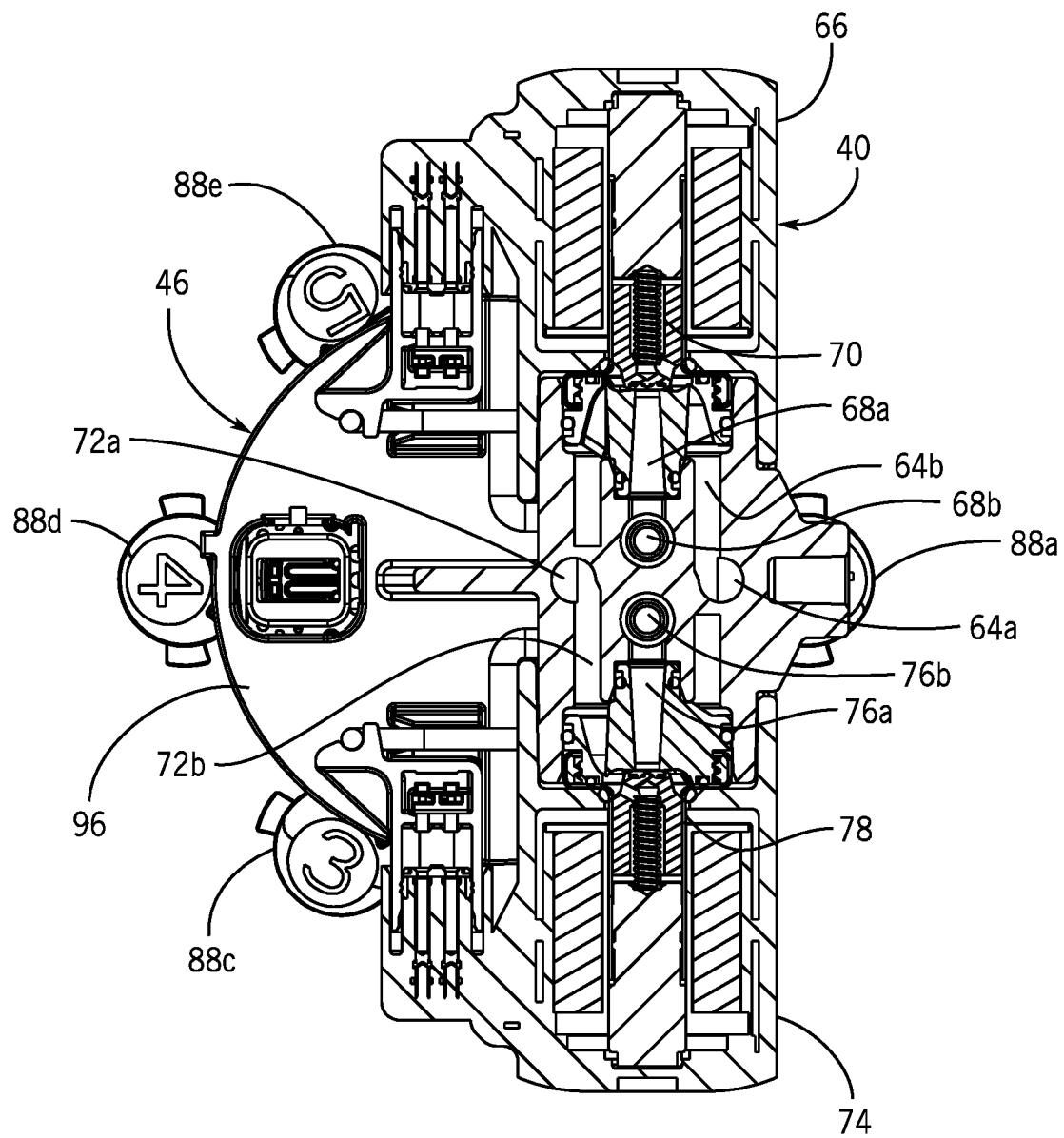
Figure 9:
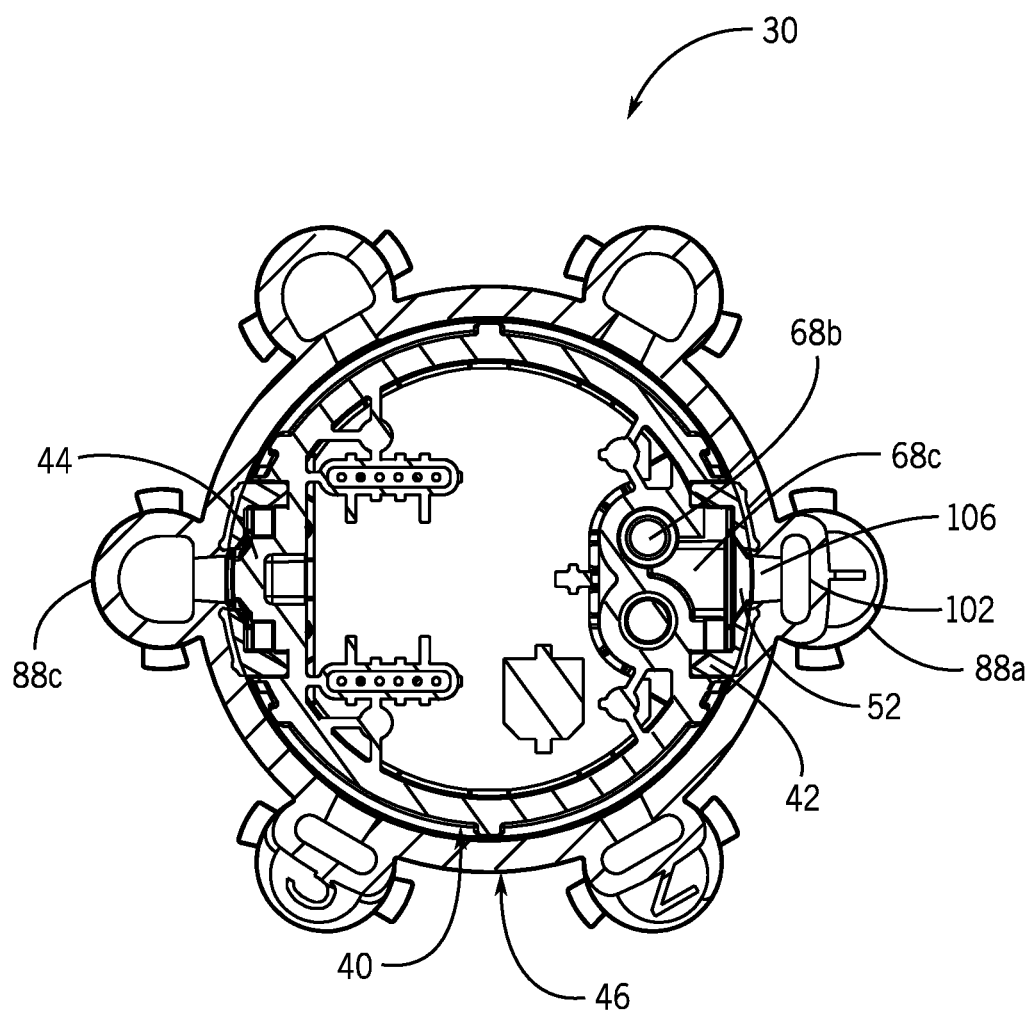
Figure 10:
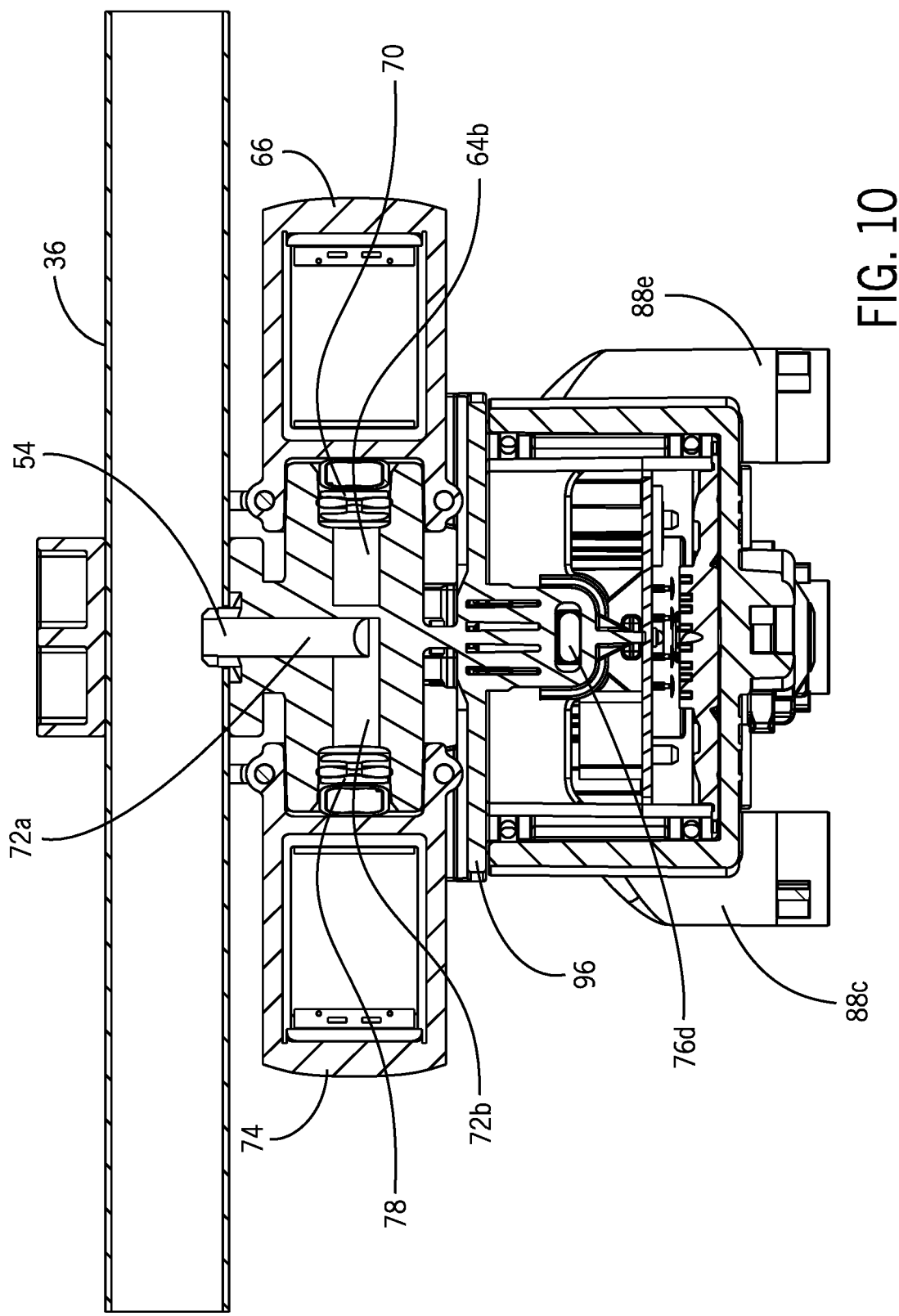
Figure 11:
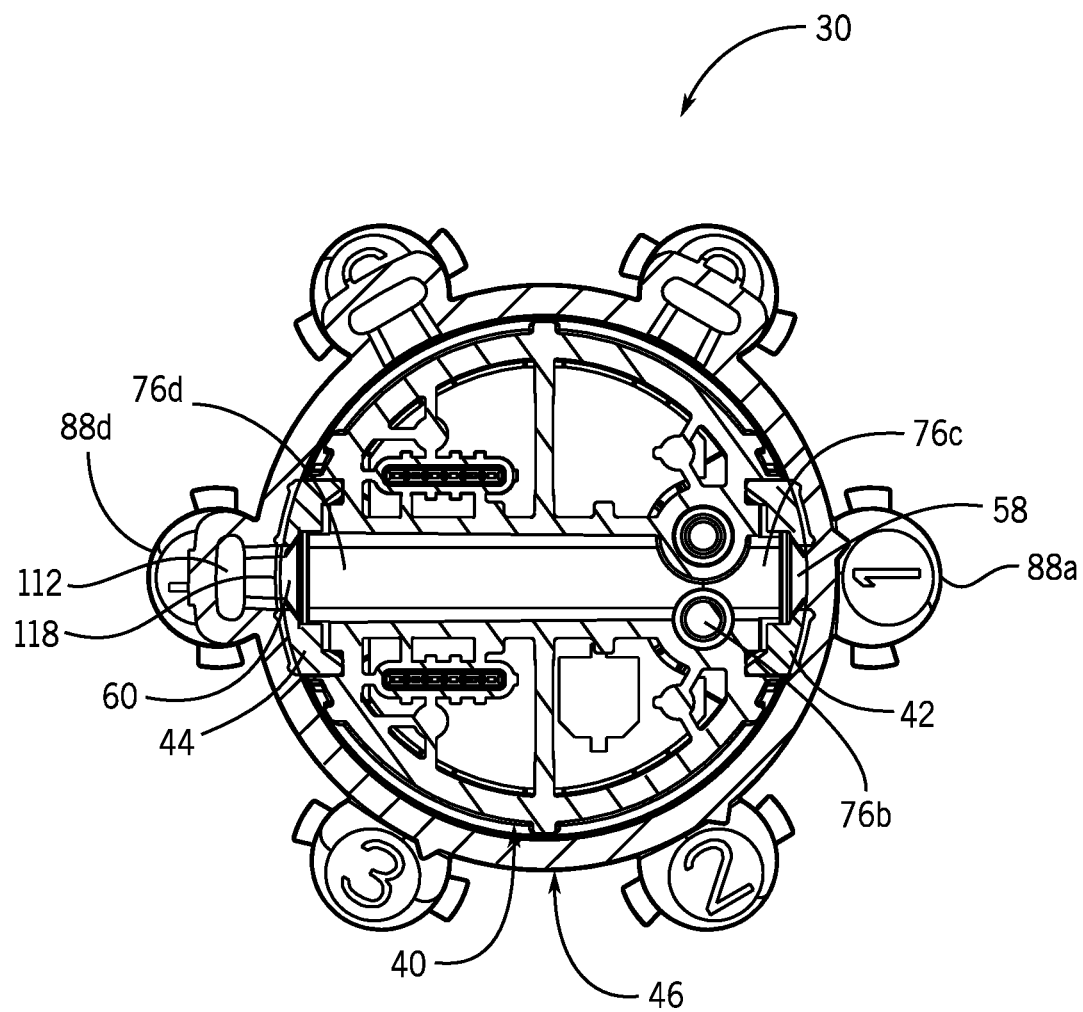

The gasket 42 is attached to the body 40 at the outlets 52, 58 and surrounds each of the outlets 52, 58 (the gasket 42 is not shown in the schematic views of FIGS. 4 and 5). The gasket 44 is attached to the body 40 at the outlet 60 and surrounds the outlet 60 (the gasket 44 is not shown in the schematic views of FIGS. 4 and 5). In an embodiment, each gasket 42, 44 is identically formed for ease in manufacture. As shown in FIG. 6, each gasket 42, 44 has a flexible body 80 which has a pair of spaced apart openings 82, 84 therethrough which extend from an inner surface of the body 80 to an outer surface of the body 80. The opening 82 of the gasket 42 aligns with the outlet 52 of the body 40 and the opening 84 of the gasket 42 aligns with the outlet 58 of the body 40 so as to provide fluid paths through the gasket 42 for the working fluid flowing from the outlets 52, 58 as described herein. The opening 84 of the gasket 44 aligns with the outlet 60 of the body 40 so as to provide a fluid path through the gasket 44 for the working fluid flowing from the outlet 60 as described herein. The opening 84 of the gasket 44 does not align with an outlet of the body 40, and this opening can be eliminated if the gaskets 42, 44 are desired to be differently formed. The gaskets 42, 44 are formed of a suitable material, such a rubber or silicone.

The turret 46 is connected to the body 40 and is movable relative to the body 40. The turret 46 is manually-movable or motor-movable. In an embodiment, the turret 46 is rotatable relative to the body 40. The turret 46 includes a wall 86, which may be cylindrical, having a plurality of spaced apart turret tubes 88a, 88b, 88c, 88d, 88e, 88f (numbered 1-6 in the drawings) extending outwardly from the outer periphery of the wall 86. A lower wall 86 closes the lower end of the wall 86. An open-ended cavity 92 is formed by the walls 88, 90. An upper end 94 of the wall 86 is proximate to a flange 96 which extends outwardly from the body 40 to close the open end of the cavity 92.

In an embodiment, the turret 46 has six turret tubes 88a, 88b, 88c, 88d, 88e, 88f and turret tube 88a (labeled 1) is diametrically opposed to turret tube 88d (labeled 4); turret tube 88b (labeled 2) is diametrically opposed to turret tube 88e (labeled 5); turret tube 88c (labeled 3) is diametrically opposed to turret tube 88f (labeled 6).

Each of turret tube 88a, 88b, 88c is formed of a side wall 98 which is closed by a top wall 100 at its upper and which forms a passageway 102 which ends in a lower outlet 104. The top wall 100 may be angled. Various spray tips (not shown) can be connected to the outlets 104 of the turret tubes 88a, 88b, 88c. The side walls 98 of the turret tubes 88a, 88b, 88c have the same height. Each turret tube 88a, 88b, 88c has a single inlet 106 which is formed as an orifice through the walls 86, 98, to allow communication from the cavity 92 to each outlet 104. Progressing around the periphery of the wall 86, the inlets 106 are horizontally aligned with each other.

Each of turret tube 88d, 88e, 88f is formed of a side wall 108 which is closed by a top wall 110 at its upper and which forms a passageway 112 which ends in a lower outlet 114. The top wall 110 may be angled. Various spray tips (not shown) can be connected to the outlets 114 of the turret tubes 88d, 88e, 88f. The side walls 108 of the turret tubes 88d, 88e, 88f have the same height, and the height of the turret tubes 88d, 88e, 88f is greater than the height of the turret tubes 88a, 88b, 88c. Each turret tube 88d, 88e, 88f has first and second spaced apart inlets 116, 118 which is formed as an orifice through the walls 86, 108, to allow communication from the cavity 92 to each outlet 114. Progressing around the periphery of the wall 86, the inlets 116 are horizontally aligned with each other and are horizontally aligned with the inlets 106 of the turret tubes 88a, 88b, 88c, and the inlets 118 are horizontally aligned with each other. In an embodiment, the inlets 118 are above the inlets 116. In an embodiment, the inlets 116, 118 are vertically aligned in each turret tube 88d, 88e, 88f.

The gaskets 42, 44 are provided between the body 40 and the wall 86 and provide a working fluid tight seal between the body 40 and the wall 86, except for the working fluid that is allowed to flow from the outlets 52, 58, 60 and the openings 82, 84 and into the inlets 106, 116, 118 as described herein. When the openings 82, 84 in the gaskets 42, 44 are not aligned with any of the inlets 106, 116, 118 of the turrets 46, working fluid cannot flow from the body 40 to the turret 46.

Now that the structure of the spray nozzle 30 has been described, operation of the spray nozzle 30 is described.

In a first position, the turret 46 is indexed relative to the body 40 so that the first outlets 52, 58 of the first and second fluid paths 50, 56 are aligned with turret tube 88a and the second outlet 60 of the second fluid path 56 is aligned with turret tube 88d. The outlet 52 of the first fluid path 50 aligns with the inlet 106 of turret tube 88a, and the first outlet 58 of the second fluid path 56 aligns with the inner surface of the wall 86 (since only a single inlet 106 is provided in turret tube 88a and the inlet 106 is below the outlet 58). The second outlet 60 of the second fluid path 56 aligns with the inlet 118 of the turret tube 88d. The inlet 116 of the turret tube 88d is not used. In this position, the spray nozzle 30 can be used to provide working fluid flow from the first fluid path 50 to turret tube 88a and can be used to provide working fluid flow from the second fluid path 56 to turret tube 88d. The working fluids are different working fluids, namely, a first working fluid that flows along the first fluid path 50, through the gasket 42 and to turret tube 88a and a second working fluid that flows along the second fluid path 56, through the gasket 44 and to turret tube 88d. The control valve 70 can be activated to allow working fluid to flow along the first fluid path 50 by opening the control valve 70, or to prevent working fluid flow through the control valve 70 by closing the control valve 70. Likewise, control valve 78 can be activated to allow working fluid to flow along the second fluid path 56 by opening the control valve 78, or to prevent working fluid flow through the control valve 78 by closing the control valve 78. The control valves 70, 78 can be controlled by a controller 120, which forms part of the spray system 20, so that both fluid paths 50, 56 are open, so that both fluid paths 50, 56 are closed, so that only the first fluid path 50 is open, or so that only the second fluid path 56 is open. The same actions as provided for in the first position result when the turret 46 is indexed relative to the body 40 so that the first outlets 52, 58 of the first and second fluid paths 50, 56 are aligned with turret tube 88*b* and the second outlet 60 of the second fluid path 56 is aligned with turret tube 88*e*. Likewise, the same actions as provided for in the first position result when the turret 46 is indexed relative to the body 40 so that the first outlets 52, 58 of the first and second fluid paths 50, 56 are aligned with turret tube 88*c* and the second outlet 60 of the second fluid path 56 is aligned with turret tube 88*f*.

In a second position, the turret 46 is indexed relative to the body 40 so that the first outlets 52, 58 of the first and second fluid paths 50, 56 are aligned with turret tube 88*d* and the second outlet 60 of the second fluid path 56 is aligned with turret tube 88*a*. The outlet 52 of the first fluid path 50 aligns with the inlet 116 of turret tube 88*d* and the first outlet 58 of the second fluid path 56 aligns with the inlet 118 of turret tube 88*d*. The second outlet 60 of the second fluid path 56 aligns with the inner surface of the wall 86 (since only a single inlet 106 is provided in turret tube 88*a* and the inlet 106 is below the outlet 60). In this position, the spray nozzle 30 can be used to provide working fluid flow from the first fluid path 50, through the gasket 44 and to turret tube 88*d* and can be used to provide working fluid flow from the second fluid path 56, through the gasket 44 and to turret tube 88*d*. The working fluids are different working fluids, namely, a first working fluid that flows along the first fluid path 50, through the gasket 44 and to turret tube 88*d* and a second working fluid that flows along the second fluid path 56, through the gasket 44 and to turret tube 88*d*. The control valve 70 can be activated by the controller 120 to allow working fluid to flow along the first fluid path 50 by opening the control valve 70, or to prevent working fluid flow through the control valve 70 by closing the control valve 70. Likewise, control valve 78 can be activated by the controller 120 to allow working fluid to flow along the second fluid path 56 by opening the control valve 78, or to prevent working fluid flow through the control valve 78 by closing the control valve 78. Therefore, the spray nozzle 30 can be controlled by the controller 120 so that both fluid paths 50, 56 are open, so that both fluid paths 50, 56 are closed, so that only the first fluid path 50 is open, or so that only the second fluid path 56 is open. When both working fluids pass through the control valves 70, 78 and along the fluid paths 50, 56, both working fluids flow out of turret tube 88*d* and mix together within the passageway 112 and out of the outlet 114. The same actions as provided for in the second position result when the turret 46 is indexed relative to the body 40 so that the first outlets 52, 58 of the first and second fluid paths 50, 56 are aligned with turret tube 88*e* and the second outlet 60 of the second fluid path 56 is aligned with turret tube 88*b*. Likewise, the same actions as provided for in the second position result when the turret 46 is indexed relative to the body 40 so that the first outlets 52, 58 of the first and second fluid paths 50, 56 are aligned with turret tube 88*f* and the second outlet 60 of the second fluid path 56 is aligned with turret tube 88*c*.

The controller 120 can be configured to provide signals to control valves 70, 78 so that both working fluids are provided to the inlets 48, 54 and that both working fluids are sprayed simultaneously. Alternatively, the controller 120 can be configured to provide a signal to control valves 70, 78 such that working fluid is provided to the inlet 48 and working fluid is sprayed from the spray nozzle 30 then to provide a signal to control valves 70, 78 such that working fluid is provided to the inlet 54 and working fluid is sprayed from the spray nozzle 30 thereby spraying the first working fluid and the second working fluid alternatively in succession.

Figure 12:
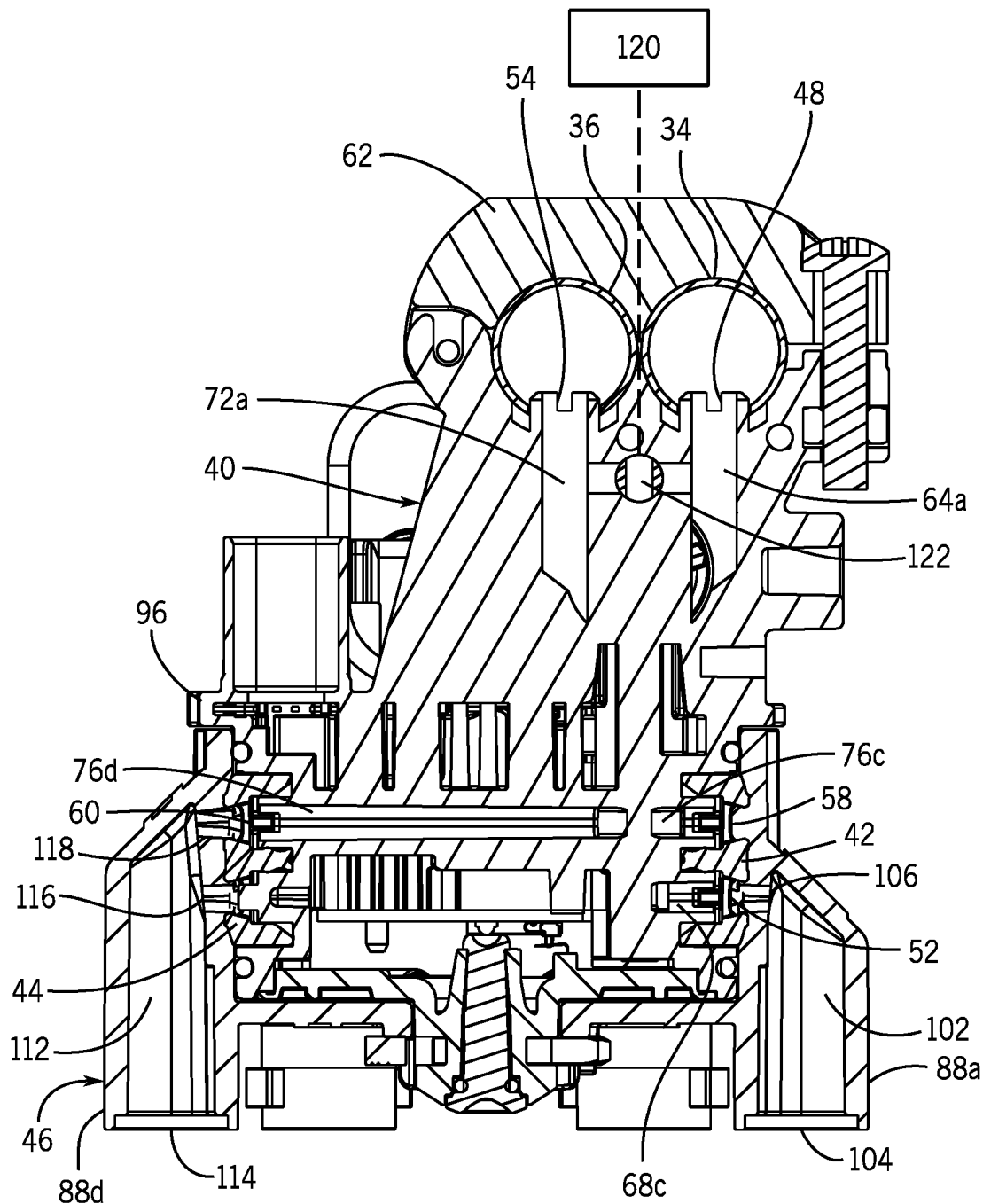

FIG. 12 shows an embodiment of the spray nozzle 30 which allows for flushing of the distribution lines 34, 36. The spray nozzle 30 includes a control valve 122 connected to the controller 120 and which is provided between the first section 64*a* of the passageway 64 and the first section 72*a* of the passageway 72. During use of the spray nozzle 30 to dispense the working fluids from the turret 46, the control valve 122 is closed so that the fluid paths 50, 56 are isolated from each other. When an operator desires to flush the distribution lines 34, 36, the control valve 122 is opened by the controller 120 and the control valves 70, 78 are closed by the controller 120. This provides a fluid path for water or a cleaning solution from the storage tank 24, through the distribution line 34, through the inlet 48, through the first section 64*a* of the passageway 64, through the open control valve 122, through the first section 72*a* of the passageway 72, through the inlet 54, through the distribution line 36 and into the storage tank 26. Active passing working fluid is completed by pressurization of the first section 64*a* of the passageway 64 or by creating a vacuum in the first section 72*a* of the passageway 72. The control valve 122 includes a solenoid valve, electromagnetic spring coil, pneumatic lever, bellows, and so on. It is to be understood that the working fluid flow can be reversed from storage tank 26 to storage tank 24, with active passing working fluid being completed by pressurization of the first section 72*a* of the passageway 72 or by creating a vacuum in the first section 64*a* of the passageway 64. The flushing can be used to eliminate an obstruction in the distribution lines 34, 36, the inlets 48, 54, the first sections 64*a*, 72*a*, and the control valve 122.

Figure 13A:
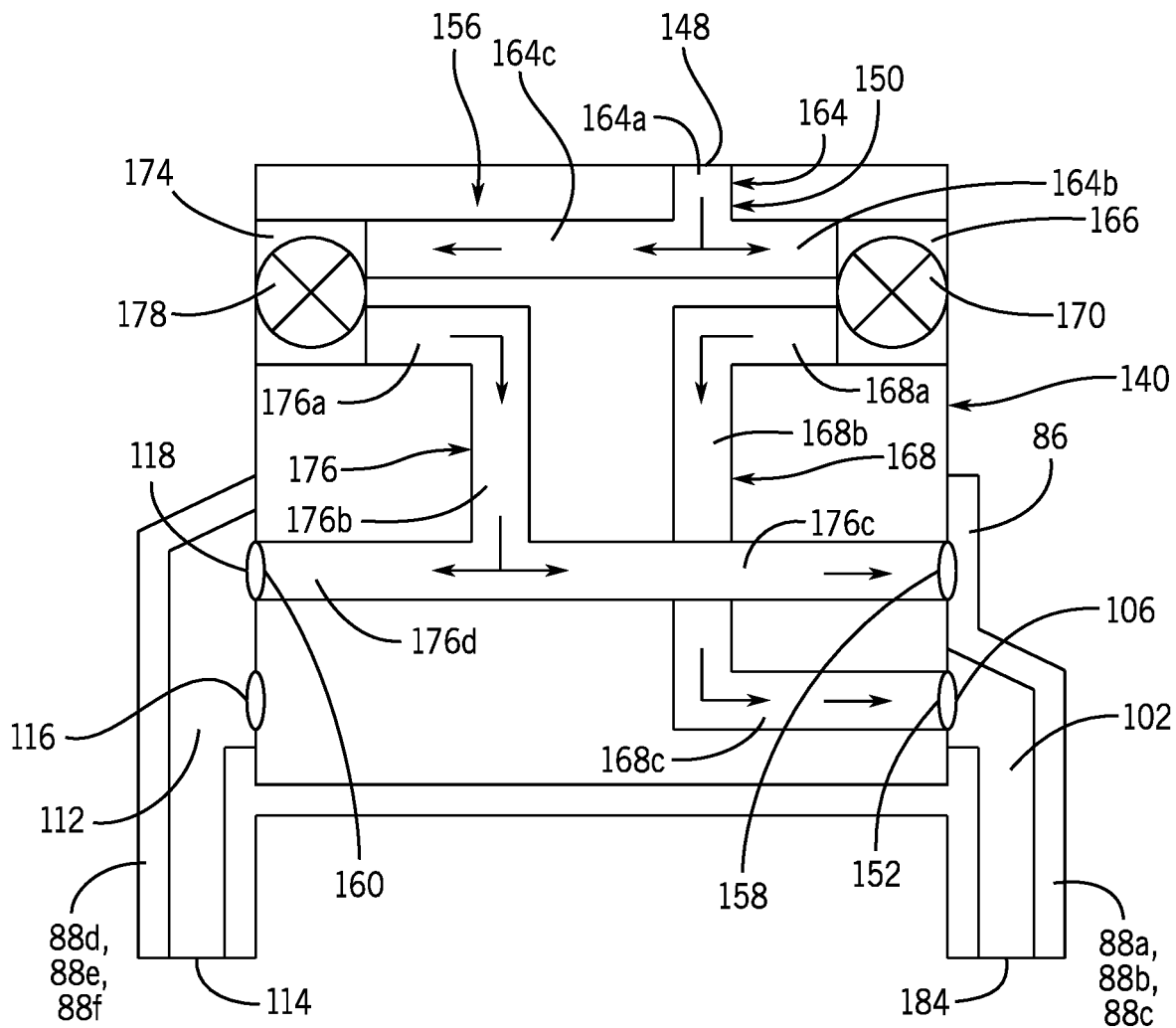
Figure 13B:
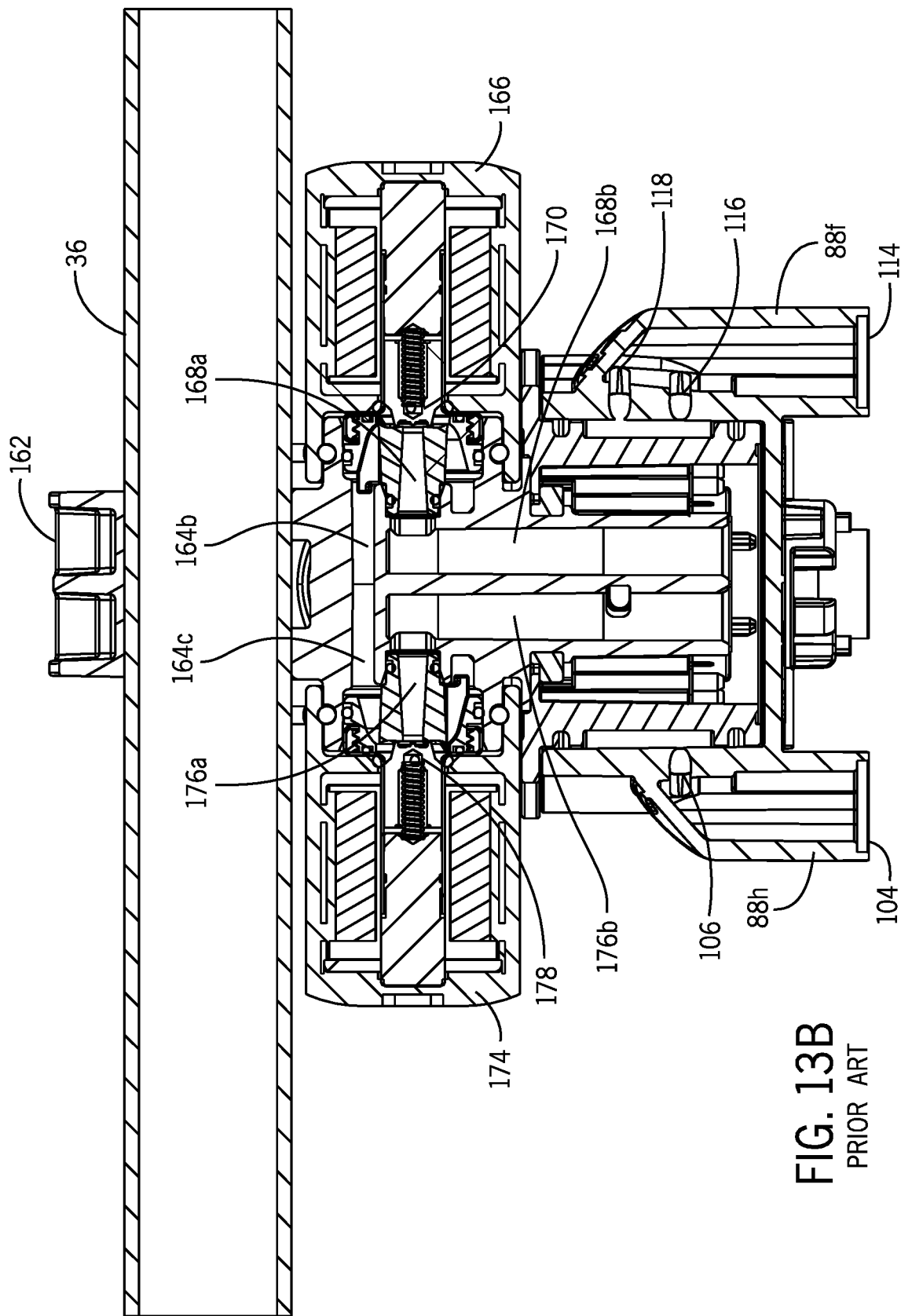
Figure 14:
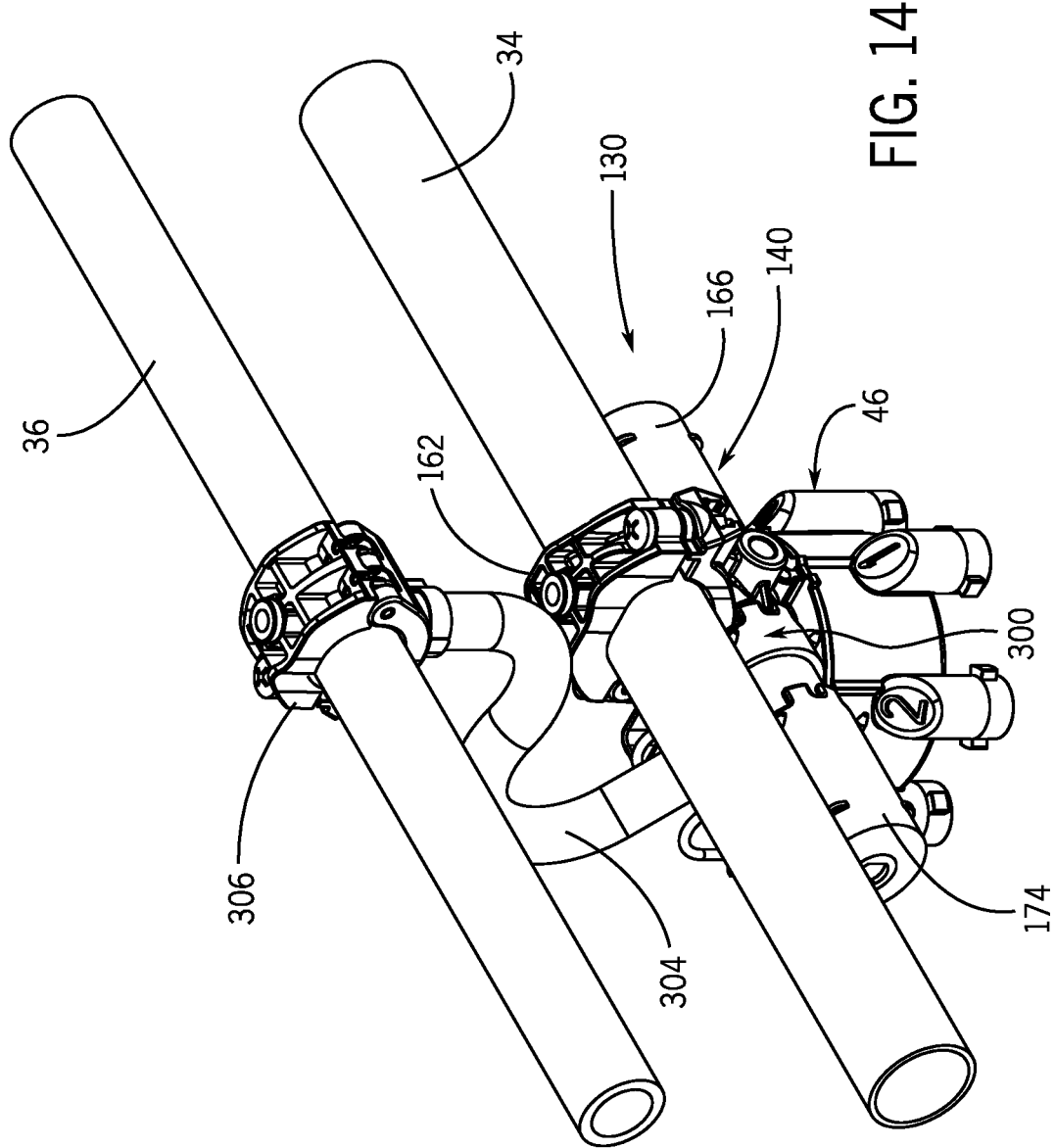
Figure 15:
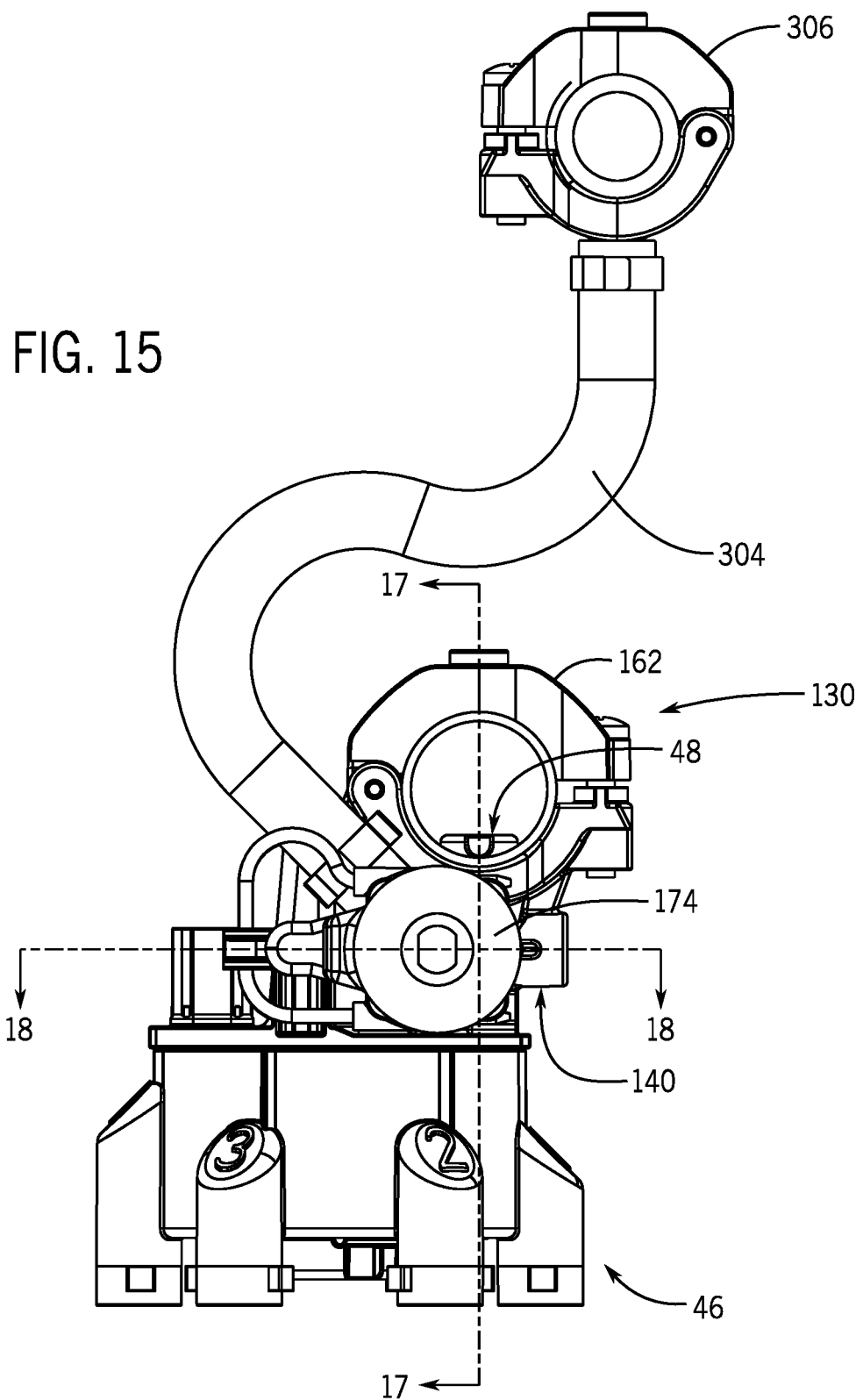
Figure 16:
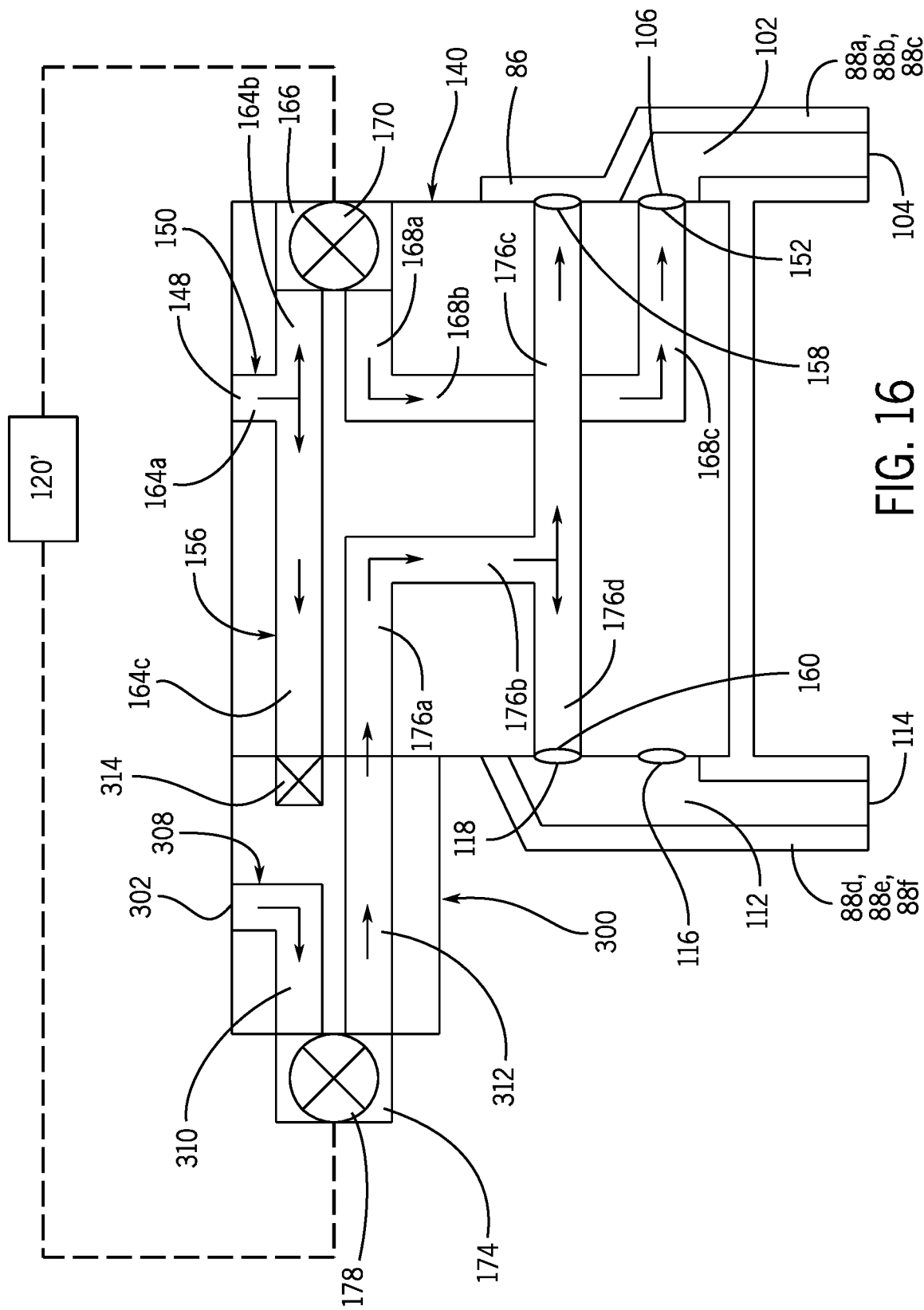
Figure 17:
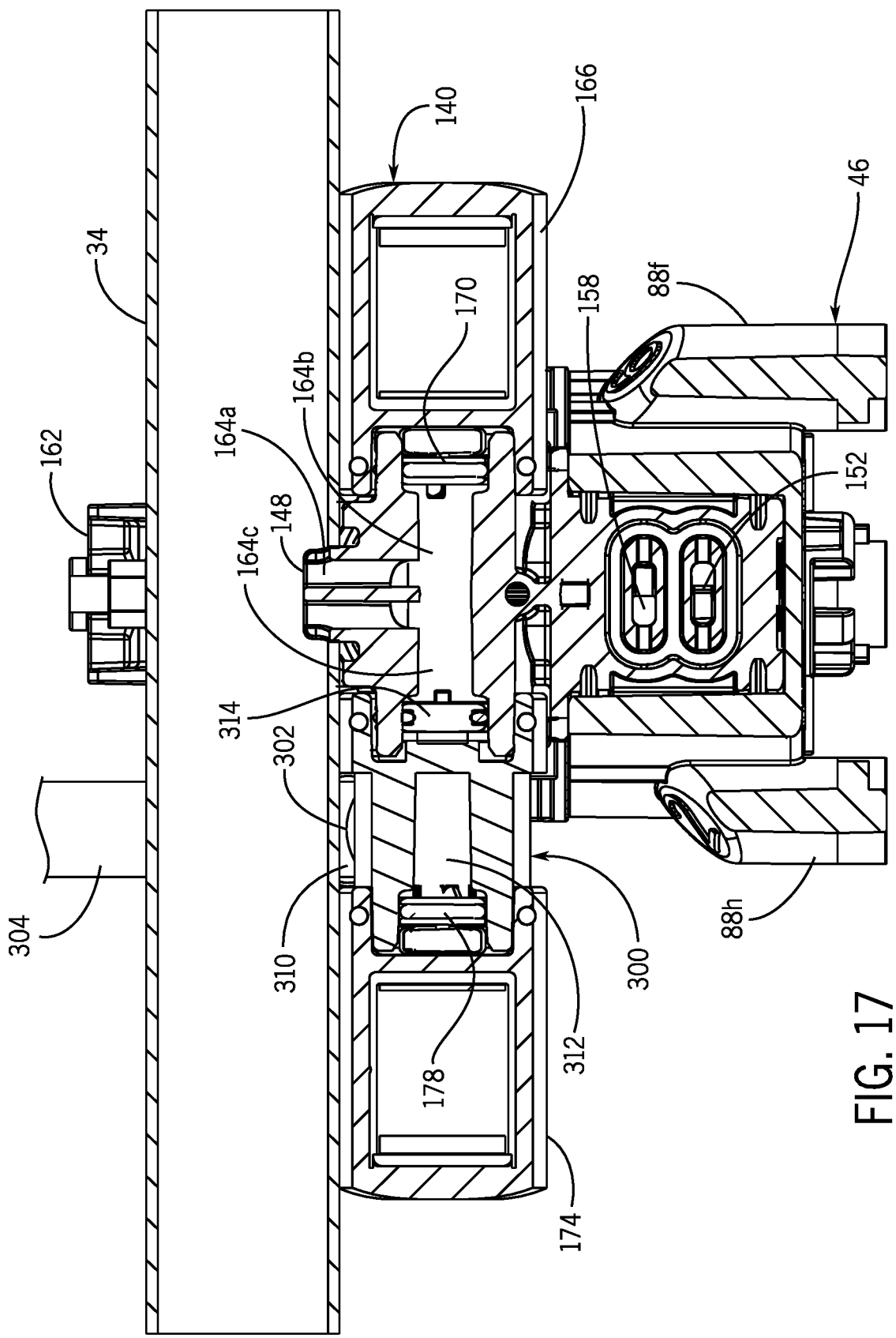
Figure 18:
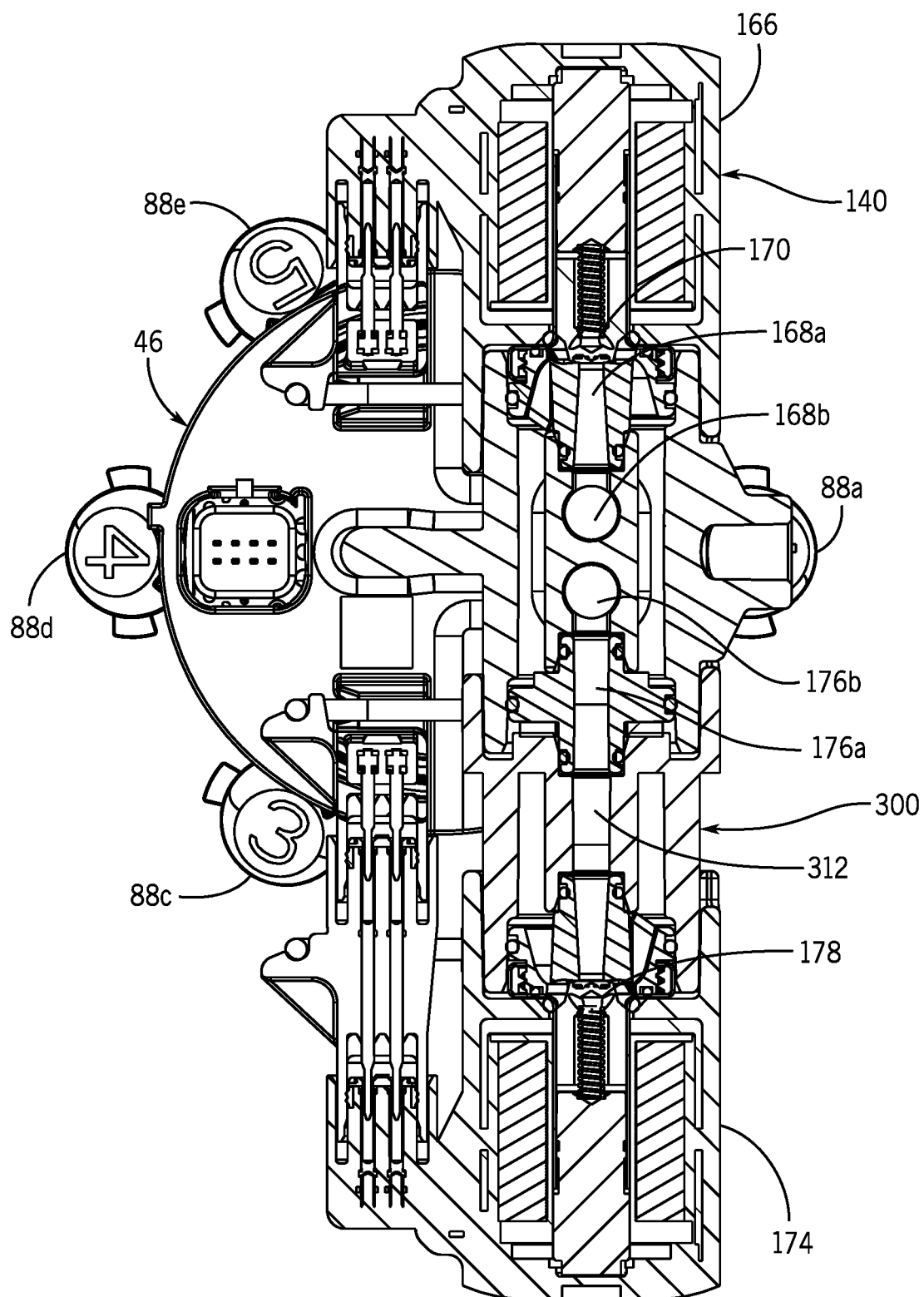

With regard to the second example embodiment depicted in FIGS. 14-18, the spray nozzle 130 has a body 140 to which a spray nozzle tube 174 is attachable to and detachable from, an adapter 300 attachable to and detachable from the body 140 and to the spray nozzle tube 174, a pair of gaskets 42, 44 attached to the body 140, and a movable turret 46 attached to the body 140. When the adapter 300 is not attached to the body 240, the spray nozzle tube 174 is directly attached to the body 140 and the spray nozzle 130. In the configuration when the adapter 300 is not attached to the body 140 and the spray nozzle tube 174 is directly attached to body 140 (as shown in FIGS. 13A and 13B), only a single working fluid can be introduced into the spray nozzle 130 and the spray nozzle 130 acts in accordance with the prior art as disclosed in US20150367358A1, US20150375247A1, US20160178422A1, US20150367357A1 (now U.S. Pat. No. 9,884,330), US20160175869A1 and/or US20140012306A1, each of which is owned by the present assignee. The provision of the adapter 300 allows a prior art nozzle to be retrofitted to accept a second working fluid and to provide an isolated path for the second working fluid.

The structure of the gaskets 42, 44 and the turret 46 are identical to that described in the first embodiment and the specifics are not repeated. As with the first embodiment, various spray tips (not shown) can be connected to the turret 46 to provide for different spray patterns from the spray nozzle 130.

The body 140 is first described without the adapter 300 attached thereto such that the body 140 is in accordance with the prior art. This arrangement is schematically shown in FIG. 13A and in cross-section in FIG. 13B. The body 140 has an inlet 148 which is connected to the distribution line 34 and is connected to a fluid path 150 which is routed though the body 140 to outlets 152, 158, 160. A mounting ring 162, which has an opening, surrounds the inlet 148 and is used to mount the body 140 to the distribution line 34.

The fluid path 150 provides a path from the inlet 148, to internal passageway 164 through spray nozzle tubes 166, 174, through internal passageways 168, 176 to outlets 152, 158, 160. The spray nozzle tube 166 has a control valve 170 which allows or disables the flow of working fluid from the passageway 164 to the passageway 168. The spray nozzle tube 174 has a control valve 178 which allows or disables the flow of working fluid from the passageway 164 to the passageway 176.

As shown, the passageway 164 has a first section 164a which extends vertically downward from the inlet 148, a second section 164b which extends horizontally from the lower end of the first section 164a to an input of the control valve 170, and a third section 164c which extends horizontally from the lower end of the first section 164a to an input of the control valve 178. The passageway 168 has a first section 168a which extends horizontally from the output of the control valve 170, a second section 168b which extends vertically downward from the end of the first section 168a, and a third section 168c which extends horizontally from the second section 168b to the outlet 152. The passageway 176 has a first section 176a which extends horizontally from the output of the control valve 178, a second section 176b which extends vertically downward from the end of the first section 176a, a third section 176c which extends horizontally from the lower end of the second section 176b to the first outlet 158, a fourth section 176d which extends horizontally from the lower end of the second section 176b to the second outlet 160.

When the adapter 300 is provided between the body 140 and the spray nozzle tube 174, the second fluid path 156 is modified from that shown in FIGS. 13A and 13B to that shown in FIGS. 14-18. The adapter 300 has an inlet 302 which is connected to the distribution line 36 by a connector 304 which includes a mounting ring 306 which is used to mount the adapter 300 to the distribution line 36. The connector 304 may be formed as a tube and is connected between the distribution line 36 and the inlet 302. The inlet 302 is connected to a fluid path 308 through the adapter 300, and which forms a section of the fluid path 156 when the adapter 300 is used. The fluid path 308 includes an internal passageway 310 which extends horizontally from the inlet 302 to an input of the control valve 178 and an internal passageway 312 which extends from the output of the control valve 178 to the first section 176a of the passageway 176. The adapter 300 has a septum 314 which mates with the third section 164c of the passageway 164 and blocks flow of working fluid through the third section 164c of the passageway 164.

Therefore, when the adapter 300 is provided between the body 140 and the spray nozzle tube 174, the fluid paths 150, 156 through the body 140 are separated or isolated from each other and are independent from each other such that no mixing of the working fluids is provided for through the body 140.

Therefore, when the adapter 300 is attached to the body 140 and to the spray nozzle tube 174, working fluid flows through the inlet 148, through the first section 164a of the passageway 164, through the second section 164b of the passageway 164, through the control valve 170, through the first section 168a of the passageway 168, through the second section 168b of the passageway 168, through the third section 168c of the passageway 168, to the outlet 152, and working fluid flows through the inlet 302 in the adapter 300, through the passageway 310 in the adapter 300, through the control valve 178 in the spray nozzle tube 174, through the passageway 312 in the adapter 300, through the first section 176a of the passageway 176 in the body 140, through the second section 176b of the passageway 176 in the body 140, into the third section 176c of the passageway 176 in the body 140, into the fourth section 176d of the passageway 176 in the body 140, and to one of the first and second outlets 158, 160.

In an embodiment, the first and second outlets 158, 160 are horizontally aligned. In an embodiment, the outlet 152 is vertically aligned with the first outlet 158 and the outlet 152 is vertically lower than the first outlet 158.

Control valves 170, 178 include solenoid valves, electromagnetic spring coil, pneumatic lever, bellows, and so on. Solenoid valves may use pulse width modulation as is known in the art to regulate the flow of the working fluid through the respective fluid paths 150, 156/308.

In an embodiment, the distribution lines 34, 36 are parallel to each other and each spray nozzle tube 166, 174 has a central axis which is parallel to the distribution lines 34, 36 and parallel to each other. In an embodiment, the spray nozzle tubes 166, 174 are perpendicular to the mounting rings 162, 306.

Now that the structure of the spray nozzle 130 and the adapter 300 have been described, operation of the spray nozzle 130 is described with the adapter 300 attached to the body 140 and the spray nozzle tube 174 attached to the adapter 300.

In a first position, the turret 46 is indexed relative to the body 140 so that the first outlets 152, 158 of the first and second fluid paths 150, 156/308 are aligned with turret tube 88a and the second outlet 160 of the second fluid path 156/308 is aligned with turret tube 88d. The outlet 152 of the first fluid path 150 aligns with the inlet 106 of turret tube 88a, and the first outlet 158 of the second fluid path 156/308 aligns with the inner surface of the wall 86 (since only a single inlet 106 is provided in turret tube 88a and the inlet 106 is below the outlet 58). The second outlet 160 of the second fluid path 156/308 aligns with the inlet 118 of the turret tube 88d. The inlet 116 of the turret tube 88d is not used. In this position, the spray nozzle 130 can be used to provide working fluid flow from the first fluid path 150 to turret tube 88a and can be used to provide working fluid flow from the second fluid path 156/308 to turret tube 88d. The working fluids are different working fluids, namely, a first working fluid that flows along the first fluid path 150, through the gasket 42 and to turret tube 88a and a second working fluid that flows along the second fluid path 156/308, through the gasket 44 and to turret tube 88d. The control valve 170 can be activated to allow working fluid to flow along the first fluid path 150 by opening the control valve 170, or to prevent working fluid flow through the control valve 170 by closing the control valve 170. Likewise, control valve 178 can be activated to allow working fluid to flow along the second fluid path 156/308 by opening the control valve 178, or to prevent working fluid flow through the control valve 178 by closing the control valve 178. The control valves 170, 178 can be controlled by a controller 120', which forms part of the spray system 20, so that both fluid paths 150, 156/308 are open, so that both fluid paths 150, 156/308 are closed, so that only the first fluid path 150 is open, or so that only the second fluid path 156/308 is open. The same actions as provided for in the first position result when the turret 46 is indexed relative to the body 140 so that the first outlets 152, 158 of the first and second fluid paths 150, 156/308 are aligned with turret tube 88*b* and the second outlet 160 of the second fluid path 156/308 is aligned with turret tube 88*e*. Likewise, the same actions as provided for in the first position result when the turret 46 is indexed relative to the body 140 so that the first outlets 152, 158 of the first and second fluid paths 150, 156/308 are aligned with turret tube 88*c* and the second outlet 160 of the second fluid path 156/308 is aligned with turret tube 88*f*.

In a second position, the turret 46 is indexed relative to the body 140 so that the first outlets 152, 158 of the first and second fluid paths 150, 156/308 are aligned with turret tube 88*d* and the second outlet 160 of the second fluid path 156/308 is aligned with turret tube 88*a*. The outlet 152 of the first fluid path 150 aligns with the inlet 116 of turret tube 88*d* and the first outlet 158 of the second fluid path 156/308 aligns with the inlet 118 of turret tube 88*d*. The second outlet 160 of the second fluid path 156/308 aligns with the inner surface of the wall 86 (since only a single inlet 106 is provided in turret tube 88*a* and the inlet 106 is below the outlet 60). In this position, the spray nozzle 130 can be used to provide working fluid flow from the first fluid path 150, through the gasket 44 and to turret tube 88*d* and can be used to provide working fluid flow from the second fluid path 156/308, through the gasket 44 and to turret tube 88*d*. The working fluids are different working fluids, namely, a first working fluid that flows along the first fluid path 150, through the gasket 44 and to turret tube 88*d* and a second working fluid that flows along the second fluid path 156/308, through the gasket 44 and to turret tube 88*d*. The control valve 170 can be activated by the controller 120' to allow working fluid to flow along the first fluid path 150 by opening the control valve 170, or to prevent working fluid flow through the control valve 170 by closing the control valve 170. Likewise, control valve 178 can be activated by the controller 120' to allow working fluid to flow along the second fluid path 156/308 by opening the control valve 178, or to prevent working fluid flow through the control valve 178 by closing the control valve 178. Therefore, the spray nozzle 130 can be controlled by the controller 120' so that both fluid paths 150, 156/308 are open, so that both fluid paths 150, 156/308 are closed, so that only the first fluid path 150 is open, or so that only the second fluid path 156/308 is open. When both working fluids pass through the control valves 170, 178 and along the fluid paths 150, 156/308, both working fluids flow out of turret tube 88*d* and mix together within the passageway 112 and out of the outlet 114. The same actions as provided for in the second position result when the turret 46 is indexed relative to the body 140 so that the first outlets 152, 158 of the first and second fluid paths 150, 156/308 are aligned with turret tube 88*e* and the second outlet 160 of the second fluid path 156/308 is aligned with turret tube 88*b*. Likewise, the same actions as provided for in the second position result when the turret 46 is indexed relative to the body 140 so that the first outlets 152, 158 of the first and second fluid paths 150, 156/308 are aligned with turret tube 88*f* and the second outlet 160 of the second fluid path 156/308 is aligned with turret tube 88*c*.

The controller 120' can be configured to provide signals to control valves 170, 178 so that both working fluids are provided to the inlets 148, 302 and are sprayed simultaneously. Alternatively, the controller 120' can be configured to provide a signal to control valves 170, 178 such that working fluid is provided to the inlet 148 and working fluid is sprayed from the spray nozzle 130, then to provide a signal to control valves 170, 178 such that working fluid is provided to the inlet 302 and working fluid is sprayed from the spray nozzle 130, thereby spraying the first working fluid and the second working fluid alternatively in succession.

Figure 19:
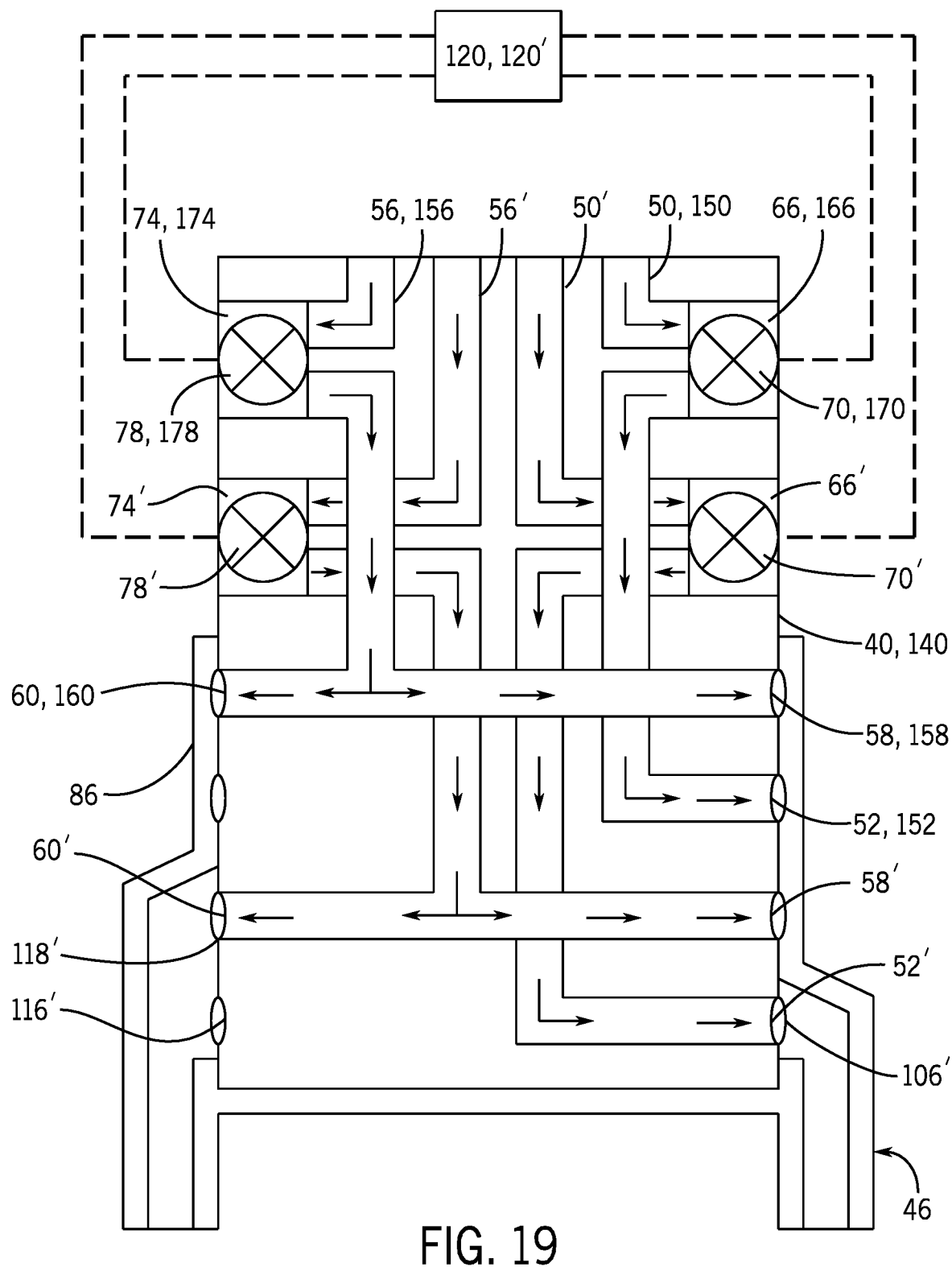
Figure 20:
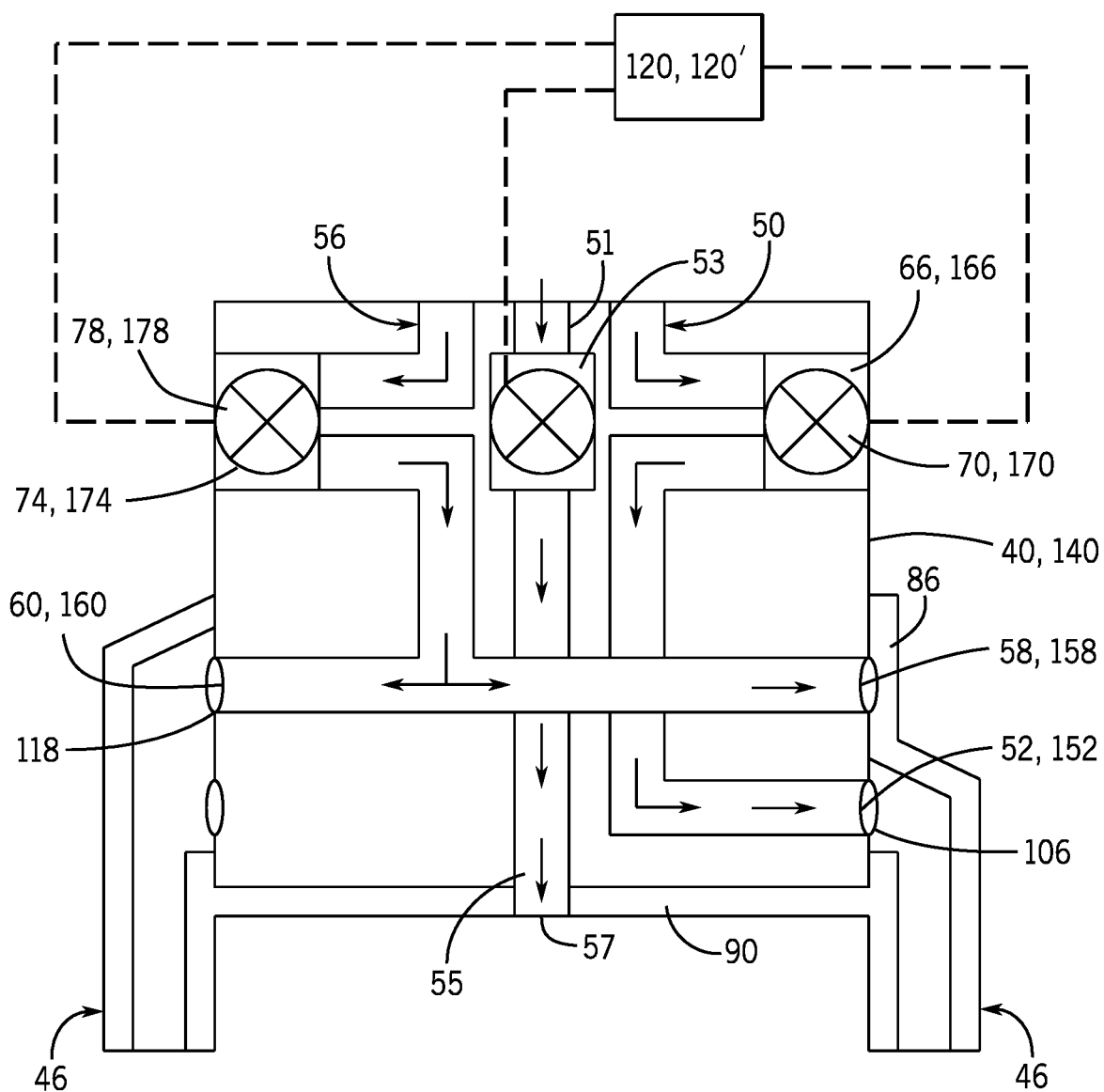

While two fluid paths are described and shown for the first and second embodiments, more than two fluid paths 50, 56, 150, 156/308 could be provided by providing additional working fluid storage tanks, along with appropriate fluid paths through the spray nozzles 30, 130. As an example, as shown schematically in FIG. 19, a second set of fluid paths 50', 56' with the associated spray nozzle tubes and control valves are provided, but are offset from the fluid paths 50, 56, 150, 156/308 such that additional turret tubes 88*g*, 88*i* are provided and would have inlets 106', 116', 118' that align with the outlets 52', 58', 60' of these additional fluid paths 50', 56'. Working fluid(s) which are different than the working fluids passing through the first and second fluid paths 50, 56, 150, 156/308 can flow through the additional fluid paths 50', 56'. In addition, or as an alternative, as shown schematically in FIG. 20, a third fluid path 51 having a control valve 53 is provided, and is offset from the fluid paths 50, 56, 150, 156/308, and has an outlet 55 which communicates with an outlet 57 in the bottom wall 90 of the turret 46. The third fluid path 51 is connected to a third working fluid source, such as a fluid storage tank (not shown). A spray tip (not shown) can be connected to the outlet 57. Operation of the control valve 53 is controlled by controller 120, 120'. A working fluid which is different than the working fluids passing through the first and second fluid paths 50, 56, 150, 156/308 can flow through the third fluid path 51.

FIG. 21 shows a modification to the wall 86 of the turret 46 which allows for flushing of the distribution lines 34, 36. The turret 46 includes a passageway 124 through the wall 86 that is offset from all of the inlets 106, 116, 118. The passageway 124 has first and second openings 126, 128 at ends thereof. In use, the turret 46 is rotated to align the opening 126 of the passageway 124 with the opening 82 in the gasket 44 and the outlet 52, 152 of the body 40, 140, and the opening 128 of the passageway 124 with the opening 84 in the gasket 44 and the outlet 58, 158 of the body 40, 140. The control valves 70, 78 or 170, 178 are then opened by the controller 120 or 120' to open the fluid paths 50, 56, 150, 156/308. This provides a fluid path for water or a cleaning solution from the storage tank 24, through the inlet 48, 148, through the first fluid path 50, 150 to the outlet 52, 152 of the body 40, 140, through the opening 82 in the gasket 42, through the opening 126 in the wall 86 of the turret 46, through the passageway 124, through the opening 128 in the wall 86 of the turret 46, through the opening 84 in the gasket 42, through the outlet 58, 158 of the body 40, 140, through the second fluid path 56, 156/308, through the inlet 54, 302, through distribution line 36, and into the storage tank 26. Active passing working fluid is completed by pressurization of the first fluid path 50, 150 or by creating a vacuum in the second fluid path 56, 156/308. It is to be understood that the working fluid flow can be reversed from storage tank 26 to storage tank 24, with active passing working fluid being completed by pressurization of the second fluid path 56, 156/308 or by creating a vacuum in the first fluid path 50, 150. The flushing can be used to eliminate an obstruction in the distribution lines 34, 36, the inlets 48, 148, 54, 154 and the fluid paths 50, 150, 56, 156/308.

Figure 22:
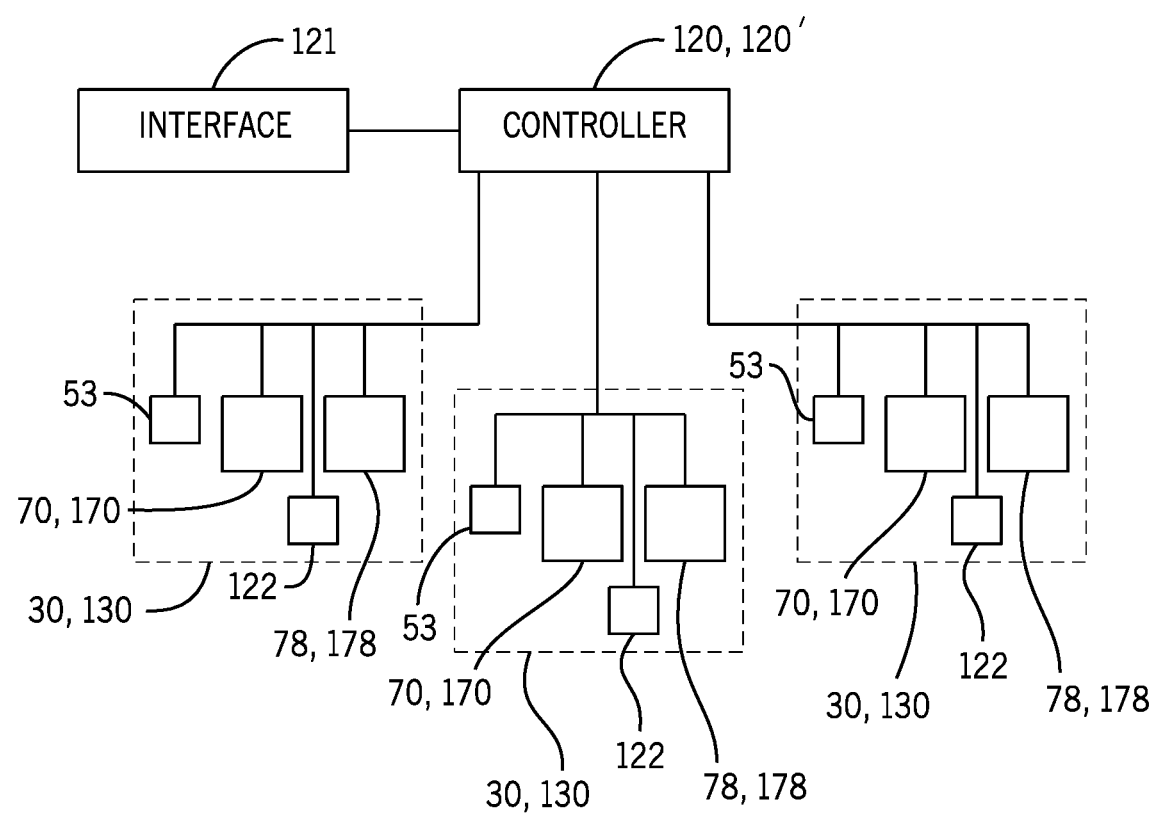

As schematically shown in FIG. 22, the control valves 70, 78, 170, 178 of each spray nozzle 30, 130 can be individually controlled by the controller 120, 120' to provide working fluid through only fluid path 50, 150, through only fluid path 56, 156/308 or through both fluid paths 50, 150, 56, 156/308. The control valve 53 of each spray nozzle 30, 130 can be individually controlled by the controller 120, 120' to provide working fluid through the fluid path 51. The controller 120, 120' is coupled to the opening/closing section valves that control working fluids to the distribution lines 34, 36 and subsequently to the spray nozzles 30, 130, 230. The controller 120, 120' is coupled to the hydraulic pumps of the vehicle 22 which supply working fluid to the main opening/closing section valves.

In addition, the controller 120, 120' may be coupled to a human-machine or operator interface 121 which allows an operator to activate all of the spray nozzle 30, 130, 230 to spray working fluid or to activate predetermined ones of the spray nozzle 30, 130, 230 to spray working fluid. The controller 120, 120' may be configured to receive input commands and to interface with the operator via the human-machine interface or operator interface 121, which may be disposed inside the cab 23 of the vehicle 22 for easy access by the operator. The operator interface 121 may be configured in a variety of ways. In some embodiments, the operator interface 121 may include one or more joysticks, various switches or levers, one or more buttons, a touch-screen interface that may be overlaid on a display, a keyboard, a speaker, a microphone associated with a speech recognition system, or various other human-machine interface devices.

Various sensors (not shown) may also be provided to observe various conditions associated with the spray system 20. In some embodiments, various sensors (e.g., pressure, flow or other sensors) may be disposed near the control valves 70, 78, 170 178, 53, 122, or elsewhere on the spray system 20. The sensors may include one or more flow sensors, such as volumetric flow sensors, that observe a volumetric flow rate associated with the hydraulic circuit and generate sensor signals based thereon.

Figure 24:
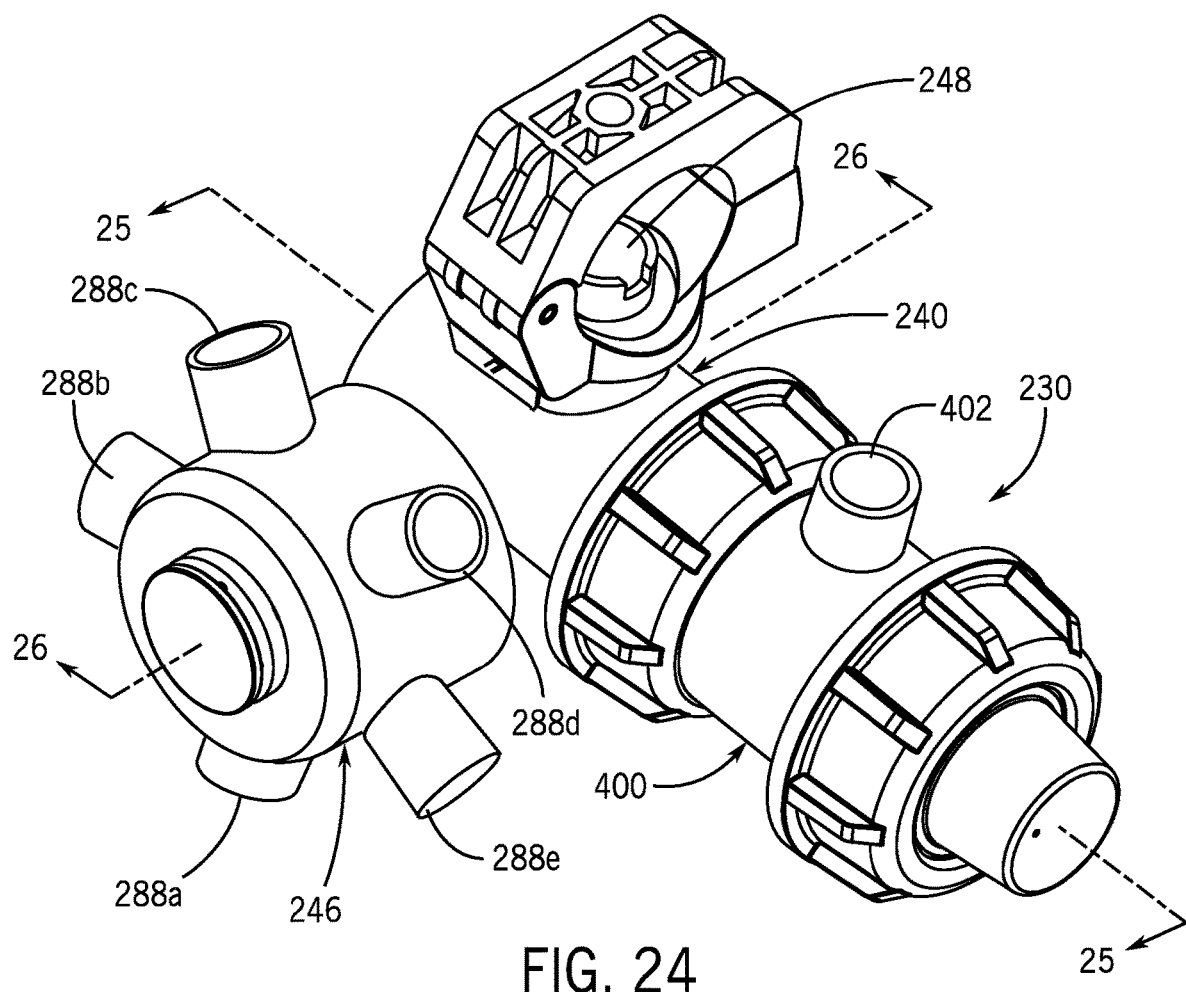
Figure 25:
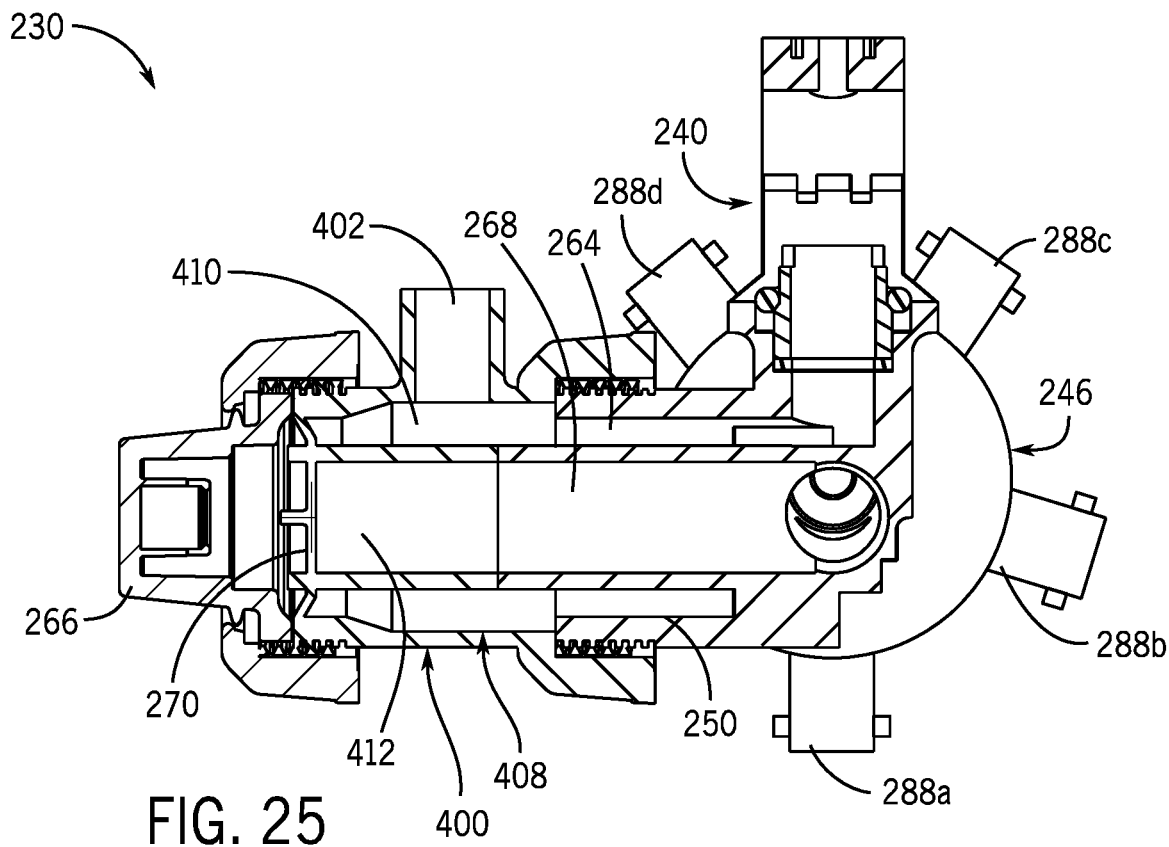
Figure 26:
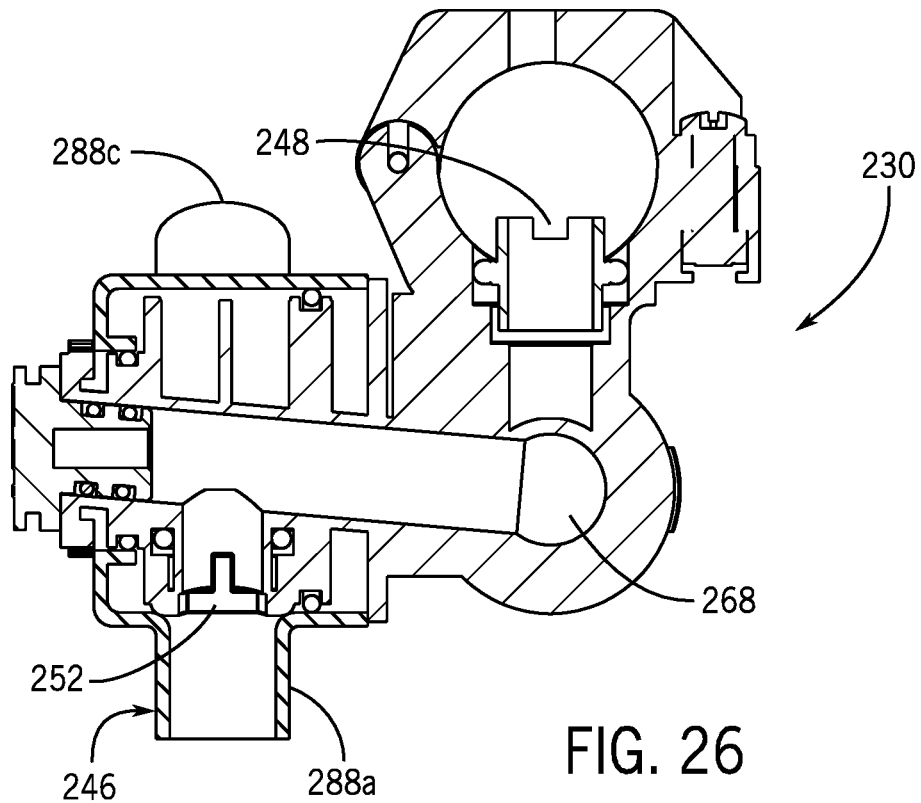

A further example embodiment of a spray nozzle 230 of the spray system 20 is shown in FIGS. 24-26. The spray nozzle 230 has multiple working fluids routed therethrough. In this embodiment, the spray nozzle 230 has a body 240, a movable turret 246 attached to the body 240 and an adapter 400 attachable to and detachable from the body 240. Various spray tips (not shown) can be connected to the turret 246 to provide for different spray patterns from the spray nozzle 230.

Figure 27:
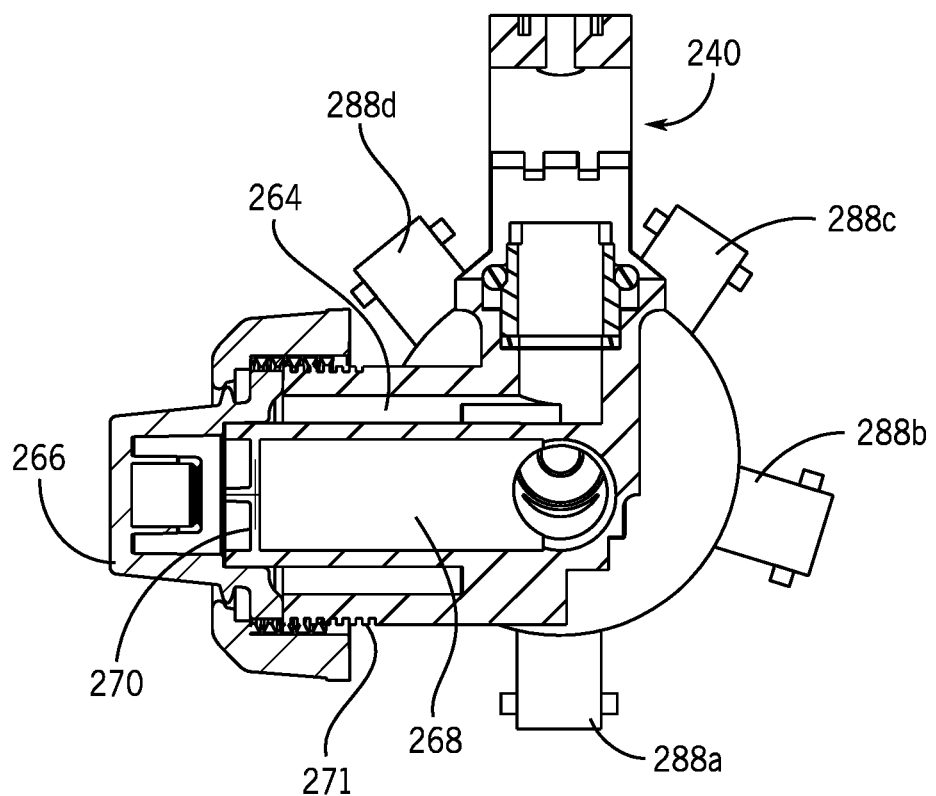

When the adapter 400 is not attached to the body 240, the spray nozzle 230 functions like a prior art nozzle and is shown in FIG. 27. In the prior art, the body 240 has an inlet 248 which is connected to the distribution line 34 (not shown) and to a fluid path 250 which is routed though the body 240 to an outlet 252 of the body 240. A control valve 270 is provided in the fluid path 250 to allow the flow of working fluid through the fluid path 250 only in one direction. In an embodiment, the control valve 270 is a one-way check valve formed a flexible membrane which is housed in a cap 266. The cap 266 and control valve 270 are removably attached to the remainder of the body 240 for example by threaded connection 271. If the pressure working fluid acting on the control valve 270 exceeds a predetermined pressure, then the control valve 270 opens and working fluid is allowed to flow from the inlet 248, along the fluid path 250, and to the outlet 252; otherwise, the working fluid cannot pass through the control valve 270. The fluid path 250 has an internal passageway 264 extending through the body 240 and which is in working fluid communication with the inlet 248 and an input to the control valve 270, and an internal passageway 268 extending through the body 240 and which is in working fluid communication with an output of the control valve 270 and the outlet 252.

The turret 246 has a plurality of turret tubes 288a, 288b, 288c, 288d, 288e having passageways therethrough. The turret 246 is movably mounted on the body 240 such that one of the turret tubes, for example turret tube 288a aligns with the outlet 252 of the body 240.

The adapter 400 has an inlet 402 which is connected to the distribution line 36 and to a fluid path 408 through the adapter 400, and which forms a section of the fluid path 250 when the adapter 400 is used. The fluid path 408 includes an internal passageway 410 which extends horizontally from the inlet 402 to an input of the control valve 270 and an internal passageway 412 which extends from the output of the control valve 270 to the passageway 268. The passageways 410, 412 are separated from each other.

To use the adapter 400, the cap 266 is removed from the remainder of the body 240 and the adapter 400 is directly attached to the remainder of the body 240 and the cap 266 is directly attached to the adapter 400, such that the adapter 400 is positioned between the remainder of the body 240 and the cap 266. The first passageway 410 of the adapter 400 connects between the passageway 264 and the inlet to the control valve 270, and the second passageway 412 of the adapter 400 connects between the control valve 270 and the passageway 268. A first working fluid passes through the inlet 248, through the passageway 264, through the first passageway 410 of the adapter 400, through the control valve 270, through the second passageway 412 of the adapter 400, through the passageway 268, through the outlet 252 to the turret 246.

While a check valve is described as the control valve 270 being used in this embodiment, the control valve 270 can be provided as a spray nozzle tube with a control valve such as that described in the first and second embodiments.

In one example application, one or more of the spray nozzles can be actuated to provide a broadcast spray of a combination of a first working fluid and a second working fluid as the spray system traverses the field. With regard to the embodiments of the spray nozzle 230 disclosed above when used with the adapter 400, for this particular application, the working fluids are combined in the internal passageway 410 such that combined fluids are deposited on the plants as the vehicle 22 traverses the field. This particular application is particularly adapted for use with chemicals as the working fluids wherein 1) if the two chemicals were stored in the same fluid tank and mixed together in the fluid tank then the chemicals would be neutralized, and 2) when the two chemicals are mixed in the spray nozzle 230, the properties of the resulting chemical dispersed therefrom is changed, but if the two chemicals were stored in the same fluid tank and mixed together in the fluid tank then the efficacy of the combined chemicals would be diminished. In an application, a chemical is provided through inlet 248 and water is provided through inlet 402 and the chemical and water are mixed in internal passageway 410. By mixing water with the chemical in the spray nozzle 230, the chemical can be diluted by the water.

Particular applications for which the spray system 20 can be used are now described as applied using various embodiments of the spray nozzles described above, with reference to the schematic views are shown in FIGS. 28A-34. It will be understood that the uses and applications described below may be implemented using one or more multi-fluid spray nozzles configured differently than the foregoing constructions described above. Thus, the various implementations of the disclosed spray system should not be limited to any one or more spray nozzle constructions. Nonetheless, to provide definite examples of the various example uses and applications, the following details will be described with reference to the example spray nozzles 30, 130 above.

FIGS. 28A-28C show that different types of fluids can be dispersed from the spray nozzles 30, 130. As shown in FIG. 28A, a first gas G1 and a second gas G2 may be dispensed from the spray nozzles 30, 130. As shown in FIG. 28B, two different liquids L1, L2 may be dispensed from the spray nozzles 30, 130. As shown in FIG. 28B, two different flowable granular solids S1, S2 may be dispensed from the spray nozzles 30, 130. Other fluid combinations can be provided, such as for example but not limited to, a liquid and a flowable granular solid, a gas and a flowable granular solid, a first gas and a second different gas.

Figure 34:
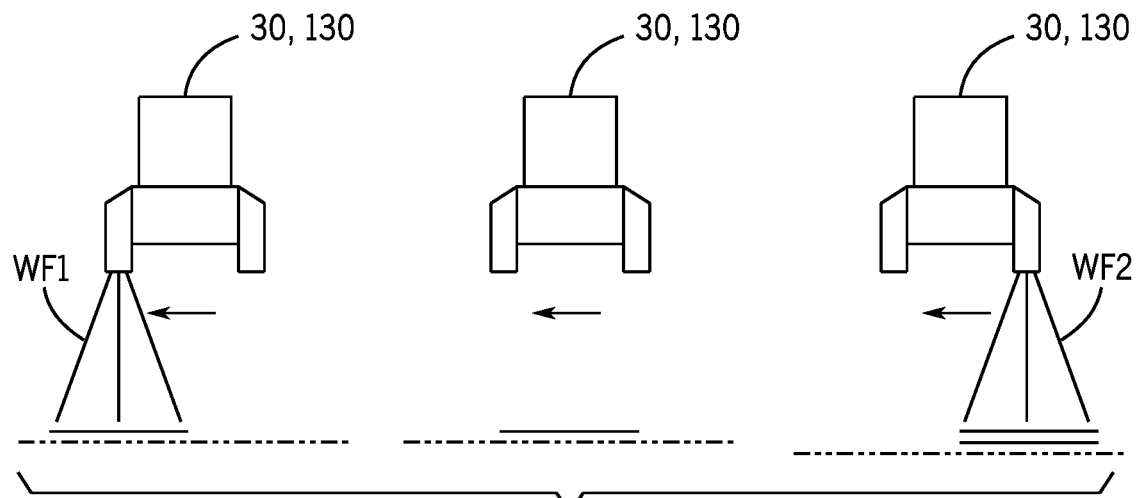

In one example application, one or more of the spray nozzles can be actuated or otherwise controlled to provide a broadcast spray of a first working fluid WF1 and then a spot treatment of a second working fluid WF2 as shown in FIG. 29A, or to provide a broadcast spray of a first working fluid WF1 and then a broadcast spray of a second working fluid WF2 as the spray system traverses the field as shown in FIGS. 29B and 34. By broadcast spray, this is meant that all spray nozzles 30, 130, or a subset of spray nozzles (e.g., left or right side spray nozzles), spray at the same time across the spray boom 28. With regard to the embodiments of the spray nozzles 30, 130 disclosed above, for this particular application, each spray nozzle 30, 130 has its turret 46 positioned into the first position such that the outlet 52 of the first fluid path 50, 150 is aligned with one of turret tube 88*a*, 88*b*, 88*c* which is a forwardmost position in the direction of travel of the vehicle 22 and the second outlet 60 of the second fluid path 56, 156/308 is aligned with one of turret tubes 88*d*, 88*e*, 88*f* which is the most rearward position in the direction of travel of the vehicle 22. As a result of this orientation of the spray nozzles 30, 130, the working fluids WF1, WF2 remain separated from each other through the spray nozzles 30, 130 and are deposited on the plants separately as the vehicle 22 traverses the field. This application is particularly adapted for use for spot treating plants, for applying targeted working fluid onto the lower leaves of the plants, and for preventing drift migration of chemicals.

When the spray nozzles 30, 130 are positioned in the first position, the spray nozzles 30, 130 are capable of first treating the plants with a broadcast spray with a first working fluid WF1 as shown in FIG. 29A, and thereafter treating the plants with a spot-treatment spray of a second working fluid WF2. This is particularly beneficial in applications in which a treatment-resistant weed is present. A chemical is provided as the first working fluid WF1 which is provided from the storage tank 24 to the fluid path 50, 150 of each spray nozzle 30, 130. A different chemical is provided as the second working fluid WF2 which is provided from the storage tank 26 to the fluid path 56, 156/308 of each spray nozzle 30, 130. In each spray nozzle 30, 130, the control valve 70, 170 is activated by the controller 120, 120' to allow the first working fluid WF1 to travel along fluid path 50, 150 and the control valve 78, 178 is activated by the controller 120, 120' to allow the second working fluid WF2 to travel along fluid path 56, 156/308. In each spray nozzle 30, 130, the first working fluid WF1 is output from fluid path 50, 150 in a broadcast spray as the vehicle 22 traverses the field and the second working fluid WF2 is output from fluid path 56, 156/308 is provided as a spot-treatment product as shown in FIG. 28C wherein the second working fluid WF2 is only provided as needed. In an embodiment, the first working fluid WF1 and the second working fluid WF2 of each spray nozzle 30, 130 are sprayed simultaneously. In an embodiment, the first working fluid WF1 and the second working fluid WF2 of each spray nozzle 30, 130 are sprayed sequentially. In an embodiment during broadcast spraying, each valve 70, 170 is opened and closed by the controller 120, 120' to pulse the fluid flow such that the broadcast spray is delivered as a pulsed spray. In a particular application, the first working fluid WF1 may be a lower cost chemical and the second working fluid WF2 may be a second, costlier and stronger chemical that spot treats the resistant weed. When the resistant weed is present under a particular spray nozzle 30, 130 along the spray boom 28, the controller 120, 120' opens the control valve 78, 178 for the second fluid path 56, 156/308 for that particular spray nozzle(s) 30, 130 to disperse the second working fluid WF2 that targets the resistant weed. As a result, the second working fluid WF2 spot treats resistant weeds as the vehicle 22 traverses the field, while also providing the broadcast spray by the spray nozzle 30, 130. In an embodiment, when the controller 120, 120' activates the control valve 78, 178 for the second fluid path 56, 156/308 for a particular spray nozzle 30, 130, the controller 120, 120' closes the valve 70, 170 for that particular spray nozzle 30, 130 so that the broadcast spray is not provided for that particular resistant weed. This may reduce application cost and overtreatment by only using the stronger chemical in a spot treating manner.

When the spray nozzles 30, 130 are positioned in the first position, the spray nozzles 30, 130 are capable of treating the plants with a first and second broadcast sprays.

Figure 30:
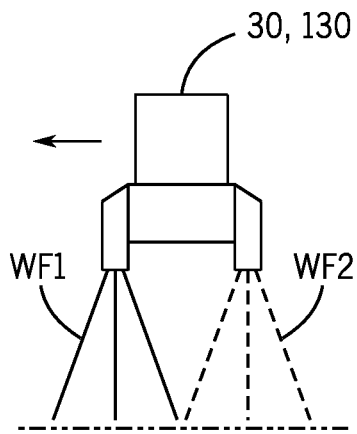

In an example embodiment, the first and second broadcast sprays are particularly beneficial in applications to prevent drift migration of the chemical by forming an air barrier. This is schematically shown in FIGS. 29B and 30. This is especially advantageous along the borders of the field so that chemicals do not drift onto neighboring properties. A liquid chemical is provided as the first working fluid WF1 which is provided from the storage tank 24 to the fluid path 50, 150 of each spray nozzle 30, 130. Air is provided as the second working fluid WF2 which is provided from the storage tank 26 to the fluid path 56, 156/308 of each spray nozzle 30, 130. In each spray nozzle 30, 130, the control valve 70, 170 is activated by the controller 120, 120' to allow the first working fluid WF1 to travel along fluid path 50, 150 and the control valve 78, 178 is activated by the controller 120, 120' to allow the second working fluid WF2 to travel along fluid path 56, 156/308. The first working fluid WF1 is output from fluid path 50, 150 in a broadcast spray as the vehicle 22 traverses the field and the second working fluid WF2 is output from fluid path 56, 156/308 in a broadcast spray as the vehicle 22 traverses the field as shown in FIG. 28B. The air is sprayed in a broadcast spray by all the spray nozzles 30, 130 on the spray boom 28 as the vehicle 22 travels across the field so as provide an air curtain or barrier rearwardly of the chemical. In an embodiment during this broadcast spray, the valve 70, 170 remains open such that the chemical broadcast spray of the first working fluid WF1 is continuous. In an embodiment during this broadcast spray, the valve 70, 170 is opened and closed to pulse the chemical flow such that the broadcast spray is delivered as a pulsed spray. The spraying of the air rearwardly of the spraying of the chemical provides an air barrier to prevent drift migration of the chemical. This is especially advantageous along the borders of the field so that chemicals do not drift onto neighboring properties. The spray nozzles 30, 130 at the borders of the field can be operated in this manner, while the other nozzles 30, 130 along the spray boom 28 operate in a different manner.

Figure 31:
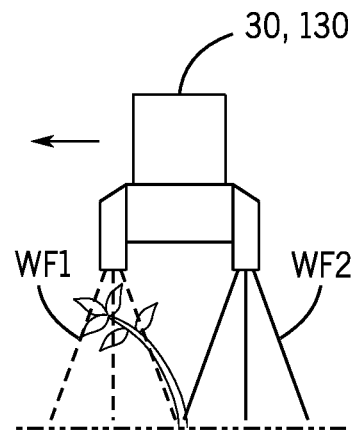

In another example embodiment, the first and second broadcast sprays are particularly beneficial in applications in which it is desired to disturb the plant canopy to allow for targeted application of a chemical. This is schematically shown in FIGS. 29B and 31. Air is provided as the first working fluid WF1 which is provided from the storage tank 24 to the fluid path 50, 150 of each spray nozzle 30, 130. A chemical is provided as the second working fluid WF2 which is provided from the storage tank 26 to the fluid path 56, 156/308 of each spray nozzle 30, 130. In each spray nozzle 30, 130, the control valve 70, 170 is activated by the controller 120, 120' to allow the first working fluid WF1 to travel along fluid path 50, 150 and the control valve 78, 178 is activated by the controller 120, 120' to allow the second working fluid WF2 to travel along fluid path 56, 156/308. In each spray nozzle 30, 130, the first working fluid WF1 is output from fluid path 50, 150 in a broadcast spray as the vehicle 22 traverses the field and the second working fluid WF2 is output from fluid path 56, 156/308 in a broadcast spray as the vehicle 22 traverses the field as shown in FIG. 28B. The air is sprayed in a broadcast spray by all the spray nozzles 30, 130 on the spray boom 28 as the vehicle 22 travels across the field so as spray the plant canopy to move the plants around as the vehicle 22 travels across the field. In an embodiment during this broadcast spray, the valve 70, 170 remains open such that the air broadcast spray is continuous. In an embodiment during this broadcast spray, the valve 70, 170 is opened and closed to pulse the air flow such that the air broadcast spray is delivered as a pulsed spray. The chemical is sprayed in a broadcast spray by all the spray nozzles 30, 130 on the spray boom 28 as the vehicle 22 travels across the field so as spray the plants with a chemical as the vehicle 22 travels across the field. In an embodiment during this chemical broadcast spray, the valve 78, 178 remains open such that the chemical broadcast spray is continuous. In an embodiment during this chemical broadcast spray, the valve 78, 178 is opened and closed to pulse the air flow such that the broadcast spray is delivered as a pulsed spray. The spraying of the air forwardly of the spraying of the chemical causes the plants to move and enables the chemical to be sprayed closer to the lower leaves of the plants. This may aid in the application of herbicide, fungicides and nutrients to the plants.

In another example embodiment, the first and second broadcast sprays are particularly beneficial in applications where a genetic modifier (e.g., RNA) and a chemical, such as a herbicide or a nutrient, is to be applied to the plants. The application of the genetic modifier to the plants makes the plant more susceptible to acceptance of the chemical, such as a herbicide or a nutrient. This is schematically shown in FIG. 34. A genetic modifier is provided as the first working fluid WF1 which is provided from the storage tank 24 to the fluid path 50, 150 of each spray nozzle 30, 130. An herbicide is provided as the second working fluid WF2 is provided from the storage tank 26 to the fluid path 56, 156/308 of each spray nozzle 30, 130. In each spray nozzle 30, 130, the control valve 70, 170 is activated by the controller 120, 120' to allow the first working fluid WF1 to travel along fluid path 50, 150 and the control valve 78, 178 is activated by the controller 120, 120' to allow the second working fluid WF2 to travel along fluid path 56, 156/308. The first working fluid WF1 is output from fluid path 50, 150 in a broadcast spray as the vehicle 22 traverses the field and the second working fluid WF2 is output from fluid path 56, 156/308 in a broadcast spray as the vehicle 22 traverses the field as shown in FIG. 28B. In an embodiment during this broadcast spray, the valve 70, 170 remains open such that the chemical broadcast spray of the first working fluid WF1 is continuous. In an embodiment during this broadcast spray, the valve 70, 170 is opened and closed to pulse the chemical flow such that the broadcast spray is delivered as a pulsed spray.

In another example embodiment, the first and second broadcast sprays are particularly beneficial in applications where the second working fluid WF2 applied to the plants activates the first working fluid WF1 applied to the plants. This is schematically shown in FIG. 34. A first chemical is provided as the first working fluid WF1 which is provided from the storage tank 24 to the fluid path 50, 150 of each spray nozzle 30, 130, and a second chemical which acts as an activating agent and which activates the properties of the first chemical is provided as the second working fluid WF2 is provided from the storage tank 26 to the fluid path 56, 156/308 of each spray nozzle 30, 130. In each spray nozzle 30, 130, the control valve 70, 170 is activated by the controller 120, 120' to allow the first working fluid WF1 to travel along fluid path 50, 150 and the control valve 78, 178 is activated by the controller 120, 120' to allow the second working fluid WF2 to travel along fluid path 56, 156/308. The first working fluid WF1 is output from fluid path 50, 150 in a broadcast spray as the vehicle 22 traverses the field and the second working fluid WF2 is output from fluid path 56, 156/308 in a broadcast spray as the vehicle 22 traverses the field as shown in FIG. 28B. In an embodiment during this broadcast spray, the valve 70, 170 remains open such that the chemical broadcast spray of the first working fluid WF1 is continuous. In an embodiment during this broadcast spray, the valve 70, 170 is opened and closed to pulse the chemical flow such that the broadcast spray is delivered as a pulsed spray. In an application, one or more of the spray nozzles can be actuated to provide a broadcast spray of a combination of a first working fluid WF1 and a second working fluid WF2 as the spray system traverses the field. This is schematically shown in FIGS. 29C and 32. With regard to the embodiments of the spray nozzles 30, 130 disclosed above, for this particular application, each spray nozzle 30, 130 has its turret 46 positioned into the second position such that the first outlets 52, 152, 58, 158 of the first and second fluid paths 50, 150, 56, 156/308 are aligned with one of turret tubes 88*d*, 88*e*, 99*f* to allow working fluids WF1, WF2 to flow along the fluid paths 50, 150, 56, 156/308. As a result of this orientation of the spray nozzles 30, 130, the working fluids WF1, WF2 remain separated from each other through the bodies 40, 140 of the spray nozzles 30, 130, but are combined in the turrets 46, 146 of the spray nozzles 30, 130 such that combined fluids are deposited on the plants as the vehicle 22 traverses the field.

FIG. 32 shows that two different types of fluids can be dispersed from the same outlet of the spray nozzles 30, 130. As shown in FIG. 28A, a first working fluid WF1 and a second working fluid WF2 are dispensed from the spray nozzles 30, 130. The first working fluid may be a liquid, a gas or a flowable solid granular material, and the second working fluid may be a liquid, a gas or a flowable solid granular material.

When the spray nozzles 30, 130 are positioned in the second position, the working fluids WF1, WF2 are combined in the spray nozzle 30, 130. This is schematically shown in FIGS. 29C and 32. This particular application is particularly adapted for use with chemicals as the working fluids WF1, WF2 wherein 1) if two chemicals were stored in the same fluid tank and mixed together in the fluid tank then the chemicals would be neutralized, and 2) when two chemicals are mixed in the spray nozzle 30, 130, the properties of the resulting chemical dispersed therefrom is changed, but if the two chemicals were stored in the same fluid tank and mixed together in the fluid tank then the efficacy of the combined chemicals would be diminished. To affect this, a first chemical is provided as the first working fluid WF1 which is provided from the storage tank 24 to the fluid path 50, 150 of each spray nozzle 30, 130, and a second chemical is provided as the second working fluid WF2 which is provided from the storage tank 26 to the fluid path 56, 156/308 of each spray nozzle 30, 130. In each spray nozzle 30, 130, the control valve 70, 170 is activated by the controller 120, 120' to allow the first working fluid WF1 to travel along fluid path 50, 150 and the control valve 78, 178 is activated by the controller 120, 120' to allow the second working fluid WF2 to travel along fluid path 56, 156/308. The first working fluid WF1 and the second working fluid WF2 are mixed together in the turret 46, 146 of each spray nozzle 30, 130 and dispersed from the spray nozzle 30, 130.

Figure 32:
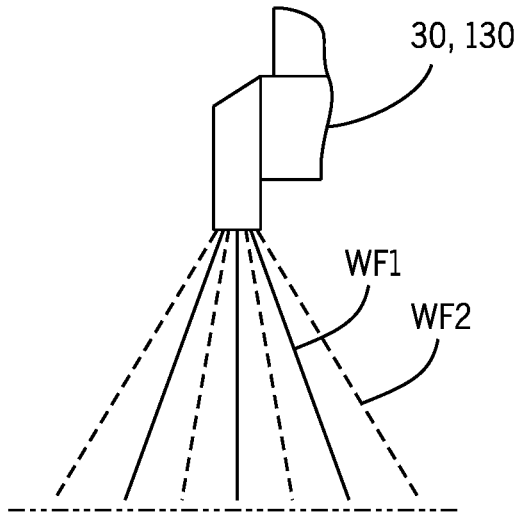

In another example embodiment when the spray nozzles 30, 130 are positioned in the second position, a chemical is provided along fluid path 50, 150 and air is provided along fluid path 56, 156/308 to change the droplet size of the chemical. This is schematically shown in FIGS. 29C and 32. To affect this, the chemical is provided as the first working fluid WF1 which is provided from the storage tank 24 to the fluid path 50, 150 of each spray nozzle 30, 130 and air is provided as the second working fluid WF2 which is provided from the storage tank 26 to the fluid path 56, 156/308 of each spray nozzle 30, 130. In each spray nozzle 30, 130, the control valve 70, 170 is activated by the controller 120, 120' to allow the first working fluid WF1 to travel along fluid path 50, 150 and the control valve 78, 178 is activated by the controller 120, 120' to allow the second working fluid WF2 to travel along fluid path 56, 156/308. The first working fluid WF1 and the second working fluid WF2 are mixed together in the turret 46, 146 of each spray nozzle 30, 130. When the chemical and the air are mixed in the spray nozzle 30, 130, the droplet size of the chemical can be controlled. Larger or smaller droplets can be formed by injecting less or more air into the chemical. Larger droplet sizes may aid in preventing drift migration. The pressure of the air provided to the spray nozzle 30, 130 can be varied by the controller 120, 120' to vary the droplet size as the vehicle 22 traverses the field.

In another application in which the spray nozzle 30, 130 is positioned in the second position, a chemical is provided along fluid path 50, 150 and water is provided along fluid path 56, 156/308. This is schematically shown in FIGS. 29C and 32. By mixing water with the chemical in the spray nozzle 30, 130, the chemical can be diluted by the water at certain points (controlled by the controller 120, 120') as the vehicle 22 traverses the field. To affect this, the chemical is provided as the first working fluid WF1 which is provided from the storage tank 24 to the fluid path 50, 150 of each spray nozzle 30, 130 and water is provided as the second working fluid WF2 which is provided from the storage tank 26 to the fluid path 56, 156/308 of each spray nozzle 30, 130. In each spray nozzle 30, 130, the control valve 70, 170 is activated by the controller 120, 120' to allow the first working fluid WF1 to travel along fluid path 50, 150 and the control valve 78, 178 is activated by the controller 120, 120' to allow the second working fluid WF2 to travel along fluid path 56, 156/308. The first working fluid WF1 and the second working fluid WF2 are mixed together in the turret 46, 146 of each spray nozzle 30, 130. When the chemical and the water are mixed in the spray nozzle 30, 130, the chemical is diluted.

Figure 33:
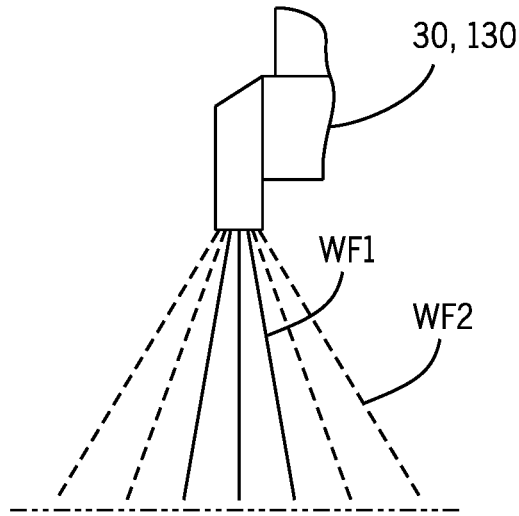

FIG. 23 shows a modified turret tube 88d, 88e, 88f. The turret tube 88d, 88e, 88f includes an inner wall 109 which separates the flow exiting the outlet 52, 152 of the body 40, 140 and flowing into the inlet 116 of the turret 46 to be separated from the flow exiting the outlet 58, 158 of the body 40, 140 and flowing into the inlet 118 of the turret 46. As a result, a first working fluid WF1 flow passageway 112a is provided from the outlet 52, 152 of the body 40, 140 and the inlet 116 of the turret 46, and a second working fluid WF2 flow passageway 112b is provided from the outlet 58, 158 of the body 40, 140 and the inlet 118 of the turret 46. This is schematically shown in FIG. 33. When the spray nozzle(s) 30, 130 has its turret 46 positioned into the second position described herein, the first outlets 52, 152, 58, 158 of the first and second fluid paths 50, 150, 56, 156/308 are aligned with the modified turret tube 88d, 88e, 88f and allow working fluids WF1, WF2 to flow along the fluid paths 50, 150, 56, 156/308. To affect this, the chemical is provided as the first working fluid WF1 which is provided from the storage tank 24 to the fluid path 50, 150 of each spray nozzle 30, 130 and into the first working fluid flow passageway 112a, and air is provided as the second working fluid WF2 which is provided from the storage tank 26 to the fluid path 56, 156/308 of each spray nozzle 30, 130 and into the second working fluid flow passageway 112b. In each spray nozzle 30, 130, the control valve 70, 170 is activated by the controller 120, 120' to allow the first working fluid WF1 to travel along fluid path 50, 150 and the control valve 78, 178 is activated by the controller 120, 120' to allow the second working fluid WF2 to travel along fluid path 56, 156/308. Because the air path provided by second working fluid flow passageway 112b surrounds the chemical path provided by the first working fluid flow passageway 112a, an air curtain is provided around the chemical. This air curtain may aid in preventing drift migration. The pressure of the air provided to the spray nozzle 30, 130 can be varied as the vehicle 22 traverses the field.

Also, the following examples are provided, which are numbered for easier reference.

1. A method of spraying multiple fluids from an agricultural machine, the method including: supplying a first working fluid from a first source to a first spray nozzle; supplying a second working fluid from a second source to the first spray nozzle; operating at least one valve in the first spray nozzle to control flow of the first working fluid from the first source to one or more outlets of the first spray nozzle; operating the at least one valve in the first spray nozzle to control flow of the second working fluid from the second source to the one or more outlets of the first spray nozzle; selectively spraying the first working fluid through the one or more outlets of the first spray nozzle; and selectively spraying the second working fluid through the one or more outlets of the first spray nozzle.

2. The method of example 1, wherein the first working fluid and the second working fluid are selectively sprayed simultaneously or sequentially.

3. The method of example 1, wherein the first working fluid and the second working fluid are selectively sprayed through a common one of the one or more outlets or through different ones of the one or more outlets.

4. The method of example 1, further comprising: supplying the first working fluid from the first source to multiple other spray nozzles; supplying the second working fluid from the second source to the other spray nozzles; operating at least one valve in the other spray nozzles to control flow of the first working fluid from the first source to one or more outlets of each of the other spray nozzles; operating the at least one valve in the spray nozzle to control flow of the second working fluid from the second source to the one or more outlets of each of the other spray nozzles; and selectively spraying the first agricultural product through the one or more outlets of each of the other spray nozzles; wherein the selective spraying of the second working fluid is only through the one or more outlets of the first spray nozzle.

5. The method of example 4, wherein the first working fluid is a broadcast product and the second working fluid is a spot-treatment product.

6. The method of example 1, wherein the first working fluid is one or more of a fertilizer, a nutrient, a herbicide, a fungicide, a pesticide, an insecticide, a genetic-modifying substance, an activating agent, and a cleaning agent.

7. The method of example 1, wherein the first working fluid is a liquid or a flowable granular solid and the second working fluid is a gas.

8. The method of example 7, wherein the second working fluid is air.

9. The method of example 1, wherein the selective spraying of the second working fluid is coordinated with the selective spraying of the first working fluid to affect one or more of a direction, a dispersion, a concentration and a state or property of the first working fluid after the first working fluid is selectively sprayed from the first spray nozzle.

10. The method of example 9, wherein the selective spraying of the second working fluid clears an obstacle from the selective spraying of the first working fluid.

11. The method of example 10, wherein the obstacle is a canopy of a crop which is cleared to open a path for the first working fluid to reach a base of the crop.

12. The method of example 9, wherein the selectively spraying of the second working fluid forms a barrier adjacent the first working fluid after it is selectively sprayed from the first spray nozzle.

13. The method of example 9, wherein, during the selective spraying of the first working fluid and the selective spraying of the second working fluid, the first working fluid contacts the second working fluid.

14. The method of example 13, wherein, during the selective spraying of the first working fluid and the selective spraying of the second working fluid, the second working fluid reduces a droplet size of the first working fluid.

15. The method of example 9, wherein, during the selective spraying of the first working fluid and the selective spraying of the second working fluid, the second working fluid reacts with the first working fluid one or more of chemically, electrically and genetically.

16. A method of spraying multiple fluids from an agricultural machine, the method including: supplying a first working fluid from a first source to a first spray nozzle; supplying a second working fluid from a second source to the first spray nozzle; operating at least one valve in the first spray nozzle to control flow of the first working fluid from the first source to one or more outlets of the first spray nozzle; operating the at least one valve in the first spray nozzle to control flow of the second working fluid from the second source to the one or more outlets of the first spray nozzle; selectively spraying the first working fluid through the one or more outlets of the first spray nozzle; and selectively spraying the second working fluid through the one or more outlets of the first spray nozzle; wherein the selective spraying of the second working fluid is coordinated with the selective spraying of the first working fluid to affect one or more of a direction, a dispersion, a concentration and a state or property of the first working fluid after the first working fluid is selectively sprayed from the first spray nozzle.

17. The method of example 16, wherein the selective spraying of the second working fluid clears an obstacle from the selective spraying of the first working fluid.

18. The method of example 16, wherein the selectively spraying of the second working fluid forms a barrier adjacent the first working fluid after it is selectively sprayed from the first spray nozzle.

19. The method of example 16, wherein, during the selective spraying of the first working fluid and the selective spraying of the second working fluid, the second working fluid reduces a droplet size of the first working fluid.

20. The method of example 16, wherein, during the selective spraying of the first working fluid and the selective spraying of the second working fluid, the second working fluid reacts with the first working fluid one or more of chemically, electrically and genetically.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms “a,” “an” and “the” are intended to include the plural forms as well, unless the context clearly indicates otherwise. It will be further understood that any use of the terms “comprises” and/or “comprising” in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A method of spraying multiple fluids from an agricultural machine, the method comprising:

supplying a first working fluid from a first source to a first spray nozzle;

supplying a second working fluid from a second source to the first spray nozzle;

operating at least one valve in the first spray nozzle to control flow of the first working fluid from the first source to one or more outlets of the first spray nozzle;

operating the at least one valve in the first spray nozzle to control flow of the second working fluid from the second source to the one or more outlets of the first spray nozzle;

selectively spraying the first working fluid through the one or more outlets of the first spray nozzle; and selectively spraying the second working fluid through the one or more outlets of the first spray nozzle;

wherein the selective spraying of the first working fluid and the second working fluid effects a first spray discharged from the first spray nozzle and a second spray discharged from the first spray nozzle, the first spray including the first working fluid and the second spray including the second working fluid, the first spray being at a different time or location than the second spray;

wherein the first spray is coordinated with the second spray so that downstream from the one or more outlets of the first spray nozzle the second working fluid affects one or more of a direction, a dispersion, a concentration and a state or property of the first working fluid after the first working fluid is selectively sprayed through the one or more outlets of the first spray nozzle.

2. The method of claim 1, wherein the first spray and the second spray are selectively sprayed simultaneously or sequentially.

3. The method of claim 1, wherein the first working fluid and the second working fluid are selectively sprayed through a common one of the one or more outlets or through different ones of the one or more outlets.

4. A method of spraying multiple fluids from an agricultural machine, the method comprising:

supplying a first working fluid from a first source to a first spray nozzle;

supplying a second working fluid from a second source to the first spray nozzle;

operating at least one valve in the first spray nozzle to control flow of the first working fluid from the first source to one or more outlets of the first spray nozzle;

operating the at least one valve in the first spray nozzle to control flow of the second working fluid from the second source to the one or more outlets of the first spray nozzle;

selectively spraying the first working fluid through the one or more outlets of the first spray nozzle;

selectively spraying the second working fluid through the one or more outlets of the first spray nozzle;

supplying the first working fluid from the first source to multiple other spray nozzles;

supplying the second working fluid from the second source to the other spray nozzles;

operating at least one valve in the other spray nozzles to control flow of the first working fluid from the first source to one or more outlets of each of the other spray nozzles;

operating the at least one valve in the spray nozzle to control flow of the second working fluid from the second source to the one or more outlets of each of the other spray nozzles; and selectively spraying the first working fluid through the one or more outlets of each of the other spray nozzles;

wherein the selective spraying of the second working fluid is only through the one or more outlets of the first spray nozzle.

5. The method of claim 4, wherein the first working fluid is a broadcast product and the second working fluid is a spot-treatment product.

6. The method of claim 1, wherein the first working fluid is one or more of a fertilizer, a nutrient, a herbicide, a fungicide, a pesticide, an insecticide, a genetic-modifying substance, an activating agent, and a cleaning agent.

7. The method of claim 1, wherein the first working fluid is a liquid or a flowable granular solid and the second working fluid is a gas.

8. The method of claim 7, wherein the second working fluid is air.

9. The method of claim 1, wherein the second working fluid of the second spray clears an obstacle from first working fluid of the first spray.

10. The method of claim 9, wherein the obstacle is a canopy of a crop which is cleared to open a path for the first working fluid to reach a base of the crop.

11. The method of claim 1, wherein the second working fluid of the second spray forms a barrier adjacent the first working fluid of the first spray.

12. The method of claim 1, wherein the first spray and the second spray are coordinated so that the first working fluid contacts the second working fluid.

13. The method of claim 12, wherein the first spray and the second spray interact downstream from the one or more outlets so that the second working fluid reduces a droplet size of the first working fluid.

14. The method of claim 1, wherein the first spray and the second spray interact downstream from the one or more outlets so that the second working fluid reacts with the first working fluid one or more of chemically, electrically and genetically.

* * * * *